(12) United States Patent
Taniguchi

(10) Patent No.: US 7,498,984 B2
(45) Date of Patent: Mar. 3, 2009

(54) POSITIONING SYSTEM, INFORMATION SUPPLY DEVICE, TERMINAL DEVICE, CONTROL METHOD OF INFORMATION SUPPLY DEVICE, CONTROL PROGRAM OF INFORMATION SUPPLY DEVICE, AND COMPUTER READABLE RECORDING MEDIUM RECORDING CONTROL PROGRAM OF INFORMATION SUPPLY DEVICE

(75) Inventor: Seiichi Taniguchi, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 11/411,021

(22) Filed: Apr. 26, 2006

(65) Prior Publication Data

US 2006/0244659 A1 Nov. 2, 2006

(30) Foreign Application Priority Data

Apr. 27, 2005 (JP) ............................. 2005-129080

(51) Int. Cl.
*G01S 1/00* (2006.01)

(52) U.S. Cl. ................................. 342/357.15

(58) Field of Classification Search ................................
342/357.01–357.17, 387, 458
See application file for complete search history.

(56) References Cited

U.S. PATENT DOCUMENTS

| 7,196,660 | B2 * | 3/2007 | Abraham et al. | ........ | 342/357.15 |
| 2006/0244658 | A1 * | 11/2006 | Abraham | ................ | 342/357.15 |
| 2007/0063897 | A1 | 3/2007 | Matsuda | | |
| 2007/0200754 | A1 * | 8/2007 | Fuchs et al. | .............. | 342/357.1 |

FOREIGN PATENT DOCUMENTS

| EP | 1 148 344 | A1 | 10/2001 |
| EP | 1 452 886 | A1 | 9/2004 |
| EP | 1 225 779 | A2 | 7/2005 |
| EP | 1655619 | A | 5/2006 |
| JP | H07-181242 | A | 7/1995 |
| JP | 2002-031675 | A | 1/2002 |
| JP | 2002-058058 | A | 2/2002 |
| JP | 2002-214320 | A | 7/2002 |
| JP | 2002-217824 | | 8/2002 |
| JP | 2002-032124 | A | 1/2004 |
| JP | 2004-235827 | A | 8/2004 |
| JP | 2005-020216 | A | 1/2005 |
| WO | WO 03-060547 | A1 | 7/2003 |
| WO | WO 2005/012939 | A1 | 10/2005 |

* cited by examiner

*Primary Examiner*—Thomas H Tarcza
*Assistant Examiner*—Nga X Nguyen
(74) *Attorney, Agent, or Firm*—Global IP Counselors, LLP

(57) ABSTRACT

A positioning system, wherein the communication base station has: signal transmitting means for transmitting a base station timing signal and a communication signal; the terminal has: standard timing signal correcting means; total delay information generating means for generating total delay information; and basic information transmitting means for transmitting basic information including the current position information and the total delay information to the information supply device and the like; and the information supply device has: base station position information storage means; basic information receiving means for receiving the basic; distance information generating means for generating distance information indicating a distance between a current position of the terminal and a position of the communication base station; propagation delay information generating means for generating propagation delay; device peculiar delay information generating means for generating device peculiar delay information indicating a delay other than the propagation delay time; and the like.

4 Claims, 11 Drawing Sheets

F I G.6
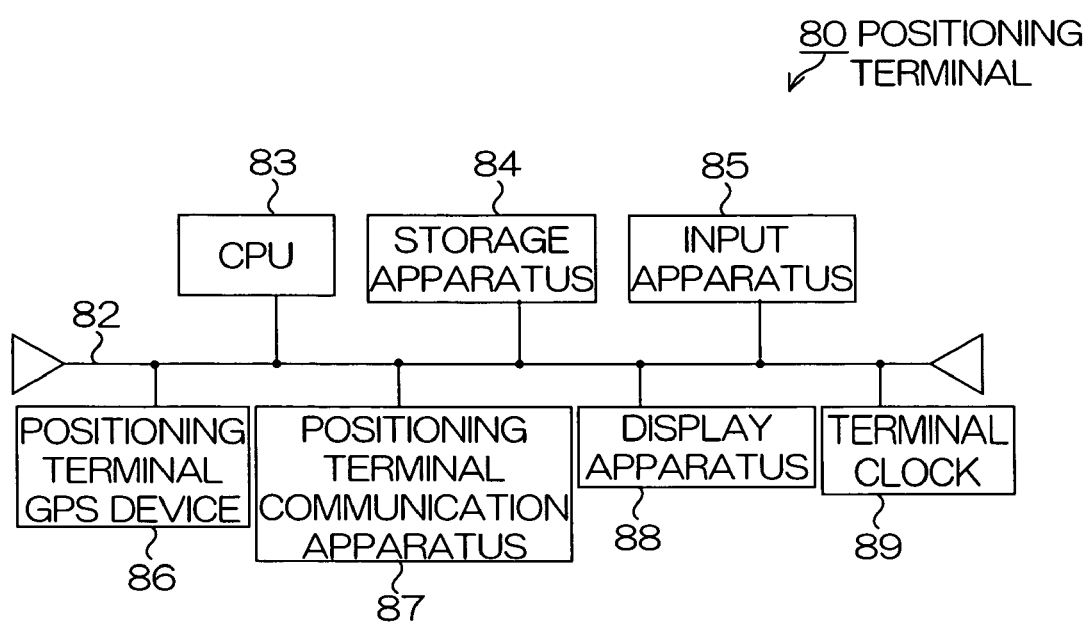

dt1:DELAY AT BASE STATION COMMUNICATION APPARATUS
dt2:CABLE DELAY AND DEVICE DELAY AT BASE STATION AND TERMINAL
dt3:PROPAGATION DELAY

TOTAL DELAY dt=dt1+dt2+dt3

DEVICE PECULIAR DELAY dmt=dt-dt3=dt1+dt2

FIG. 11

BASE STATION POSITIONING METHOD (a) POSITION OF BASE STATION 20A:$(X1,Y1,Z1)$
POSITION OF BASE STATION 20B:$(X2,Y2,Z2)$
POSITION OF BASE STATION 20C:$(X3,Y3,Z3)$ (b) $tb01$:PROPAGATION TIME OF SIGNAL CS1a FROM BASE STATION 20A TO POSITIONING TERMINAL 80
$tb02$:PROPAGATION TIME OF SIGNAL CS1b FROM BASE STATION 20B TO POSITIONING TERMINAL 80
$tb03$:PROPAGATION TIME OF SIGNAL CS1c FROM BASE STATION 20C TO POSITIONING TERMINAL 80

(c) $t1$:SENDING TIME OF SIGNAL CS1a
$t2$:SENDING TIME OF SIGNAL CS1b
$t3$:SENDING TIME OF SIGNAL CS1c (d) $dmta$:DELAY IN BASE STATION 20A AND DELAY IN TERMINAL (MACHINE PECULIAR DELAY)
$dmtb$:DELAY IN BASE STATION 20B AND DELAY IN TERMINAL (MACHINE PECULIAR DELAY)
$dmtc$:DELAY IN BASE STATION 20C AND DELAY IN TERMINAL (MACHINE PECULIAR DELAY)

(e) $C$:PROPAGATION SPEED OF SIGNAL CS1a,CS1b,CS1c (SPEED OF LIGHT)

(f) $td01$:TIME DIFFERENCE BETWEEN SENDING TIME OF SIGNAL CS1a AND TIME WHEN POSITIONING TERMINAL 80 RECEIVES SIGNAL CS1a
$td02$:TIME DIFFERENCE BETWEEN SENDING TIME OF SIGNAL CS1b AND TIME WHEN POSITIONING TERMINAL 80 RECEIVES SIGNAL CS1b
$td03$:TIME DIFFERENCE BETWEEN SENDING TIME OF SIGNAL CS1c AND TIME WHEN POSITIONING TERMINAL 80 RECEIVES SIGNAL CS1c (g) $t0$:TIME WHEN POSITIONING TERMINAL 80 RECEIVES SIGNAL CS1a,CS1b,CS1c (h) $(X,Y,Z)$:POSITION OF POSITIONING TERMINAL 80

(i) EQUATION(1): $(X-X1)^2+(Y-Y1)^2+(Z-Z1)^2=(tb01 \times C)^2$
EQUATION(2): $(X-X2)^2+(Y-Y2)^2+(Z-Z2)^2=(tb02 \times C)^2$
EQUATION(3): $(X-X3)^2+(Y-Y3)^2+(Z-Z3)^2=(tb03 \times C)^2$ (j) EQUATION(4): $t1+tb01+dmta=t0$
EQUATION(5): $t2+tb02+dmtb=t0$
EQUATION(6): $t3+tb03+dmtc=t0$ (k) EQUATION(7): $td01=t0-t1=(t1+tb01+dmta)-t1=tb01+dmta$
EQUATION(8): $td02=t0-t2=(t2+tb02+dmtb)-t2=tb02+dmtb$
EQUATION(9): $td03=t0-t3=(t3+tb03+dmtc)-t3=tb03+dmtc$ UNKNOWN NUMBERS: $X,Y,Z,tb01,tb02,tb03$
SIX UNKNOWN NUMBERS CAN BE OBTAINED BY SOLVING EQUATIONS(1),(2),(3),(7),(8) AND (9) SIMULTANEOUSLY F I G. 1 3
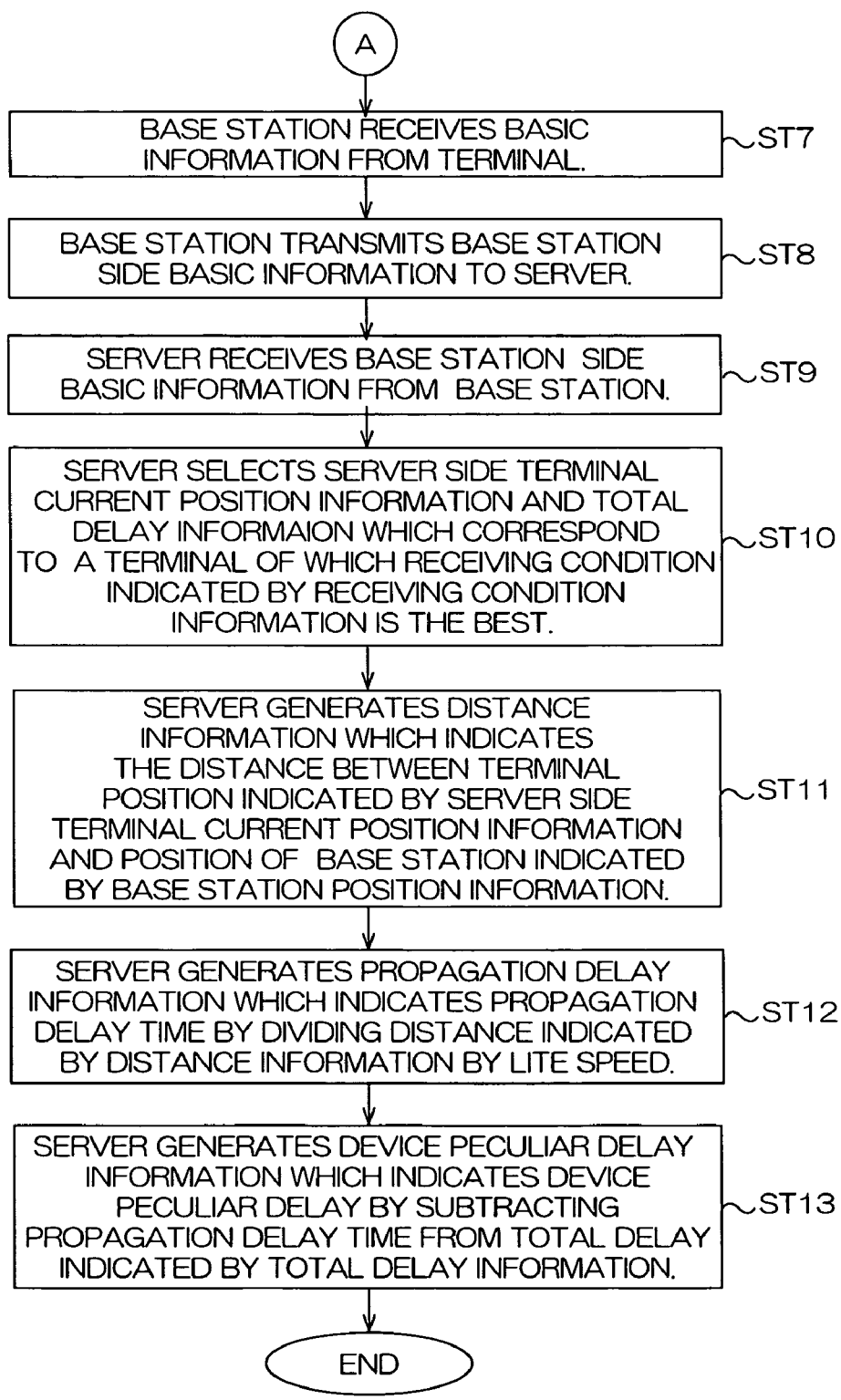

POSITIONING SYSTEM, INFORMATION SUPPLY DEVICE, TERMINAL DEVICE, CONTROL METHOD OF INFORMATION SUPPLY DEVICE, CONTROL PROGRAM OF INFORMATION SUPPLY DEVICE, AND COMPUTER READABLE RECORDING MEDIUM RECORDING CONTROL PROGRAM OF INFORMATION SUPPLY DEVICE

This application claims the priorities benefit under 35 U.S.C.§ 119 of Japanese Patent Application No. 2005-129080 filed on Apr. 27, 2005, which is hereby incorporated in its entirety by reference.

BACKGROUND

1. Technical Field

The present invention relates to a positioning system which uses signals from positioning satellites, information supply device, a terminal, a control method of the information supply device, a control program of the information supply device, and a computer readable recording medium recording the control program of the information supply device.

2. Related Art

In the past, for example, in a so-called digital mobile communication system in a CDMA (Code Division Multiple Access) system, a method to detect a position based on an arrival time difference of a receiving signal between a plurality of base stations and a mobile wireless terminal relying on the assumption that a clock synchronization is assured among the plural base stations has been known (for example, JP A-7-181242).

In such a positioning method, there is a need for time (transmission timing) when a signal is transmitted from a base station to be precise. However, a timing when a signal is transmitted from a base station, is delayed inside the base station between a time when a timing signal is generated and a time when the timing signal is transmitted, for example.

To the above mentioned situation, there is proposed a technique of installing an offset measuring instrument, obtaining offset estimation values of a transmission timing based on signals received at a plurality of monitoring points, and selecting the smallest value from among these offset estimation values to define an offset measurement value of the transmission timing of a wireless base station (JPA-2002-217824, FIG. 5, etc.).

However, inside the offset measuring instrument as well as inside the base station, there occurs a signal delay such as an antenna delay, a cable delay, or a filter delay. On the other hand, it is a general portable terminal to carry out positioning based on signals from base stations, and a signal delay inside the portable terminal is not always equal to that of the above-described offset measuring instrument.

Thus, if such a general portable terminal carries out positioning by using the offset measurement value generated by the offset measuring instrument, an error of positioning computation may be increased.

SUMMARY

Therefore, it is an advantage of some aspects of the invention to provide a positioning system, an information supply device, a terminal, an information supply device control method, an information supply device control program, and a computer readable recording medium having recorded therein the information supply device control program, which are capable of providing a correction value of a transmission timing of a signal from a communication base station which is capable of reducing an error of positioning computation by a positioning terminal without a need for a significant system change of the communication base station.

According to a first aspect of the invention, the advantage can be attained by a positioning system, comprising: a communication base station; a terminal communicable with the communication base station; an information supply device communicable with the communication base station and the terminal; wherein the communication base station has: signal transmitting means for transmitting a base station timing signal and a communication signal which the communication base station generates; the terminal has: current position information generating means for generating current position information indicating a current position based on satellite signals which are signals from positioning satellites; satellite time information generating means for generating satellite time information indicating a satellite time which is a time of the positioning satellites, based on the satellite signals; standard timing signal correcting means for correcting a standard timing signal based on the satellite time information; total delay information generating means for generating total delay information indicating a total delay which is a timing difference between the base station timing signal and the standard timing signal; and basic information transmitting means for transmitting basic information including the current position information and the total delay information to the information supply device; and the information supply device has: base station position information storage means for storing base station position information indicating a position of the communication base station; basic information receiving means for receiving the basic information from the terminal via the communication base station; distance information generating means for generating distance information indicating a distance between a current position of the terminal and a position of the communication base station based on the current position information and the base station position information; propagation delay information generating means for generating propagation delay information indicating a propagation delay time required for the communication signal to propagate the distance; device peculiar delay information generating means for generating device peculiar delay information indicating a delay other than the propagation delay time based on the total delay information and the propagation delay information; and device peculiar delay information transmitting means for transmitting the device peculiar delay information to a positioning terminal for carrying out positioning based on the communication signal from the communication base station, the positioning terminal having configuration identical to the terminal with respect to reception of the base station timing signal and the communication signal.

According to the configuration of the first aspect of the invention, the communication base station has signal transmitting means for transmitting a base station timing signal and a communication signal which the communication base station generates.

It is general that the communication base station transmits the timing signal and the communication signal, and thus, the communication base station does not need a significant system change of a general communication base station.

The terminal can generate the total delay information by the total delay information generating means. The total delay is a timing difference between the base station timing signal and the standard timing signal corrected based on the satellite time information. The total delay includes: a delay due to a drift when the base station timing signal is generated in the communication base station and a delay in the communication base station from generation to transmission of the base station timing signal in the communication base station.

In addition, the total delay includes a propagation delay time required for the base station timing signal to arrive from the communication base station at the terminal.

Further, the total delay includes a delay inside the terminal caused by the base station timing signal passing through a cable and a filter or the like after arrival at an antenna of the terminal.

Furthermore, the total delay includes a delay of the standard timing signal itself. The standard timing signal is corrected by the satellite time information, and however, the satellite signal itself delays inside the terminal. As a result, a delay occurs with the standard timing signal as well, compared with a timing caused by the true satellite time.

As described above, the total delay includes all of the delay inside the communication base station, the propagation delay between the communication base station and the terminal, and the delay inside terminal. For the purpose of computation of the total delay, there is no need for computing individual delays such as a delay due to a drift or a cable inside the communication base station, and there is no need for computing individual delays inside the terminal. Thus, it is possible to eliminate an effect of an error in computation of individual delays inside the communication base station and inside the terminal and an effect of an error in computation of propagation delay. That is, the total delay eliminates the effects of errors in delay computation due to the individual causes described above while including all of the delays inside the communication base station, inside the terminal, and between the communication base station and the terminal.

On the other hand, the information supply device can receive the basic information from the terminal by the basic information receiving means.

The information supply device can generate distance information indicating a distance between a current position of the terminal and a position of the communication base station by the distance information generating means.

The information supply device can generate propagation delay information indicating a time required for the communication signal to propagate the distance by the propagation delay information generating means.

The information supply device can generate device peculiar delay information indicating a delay other than the propagation delay time by the device peculiar delay information generating means.

The above described device peculiar delay information is a delay other than the propagation delay time, and thus, is information indicating a delay inside the communication base station and the terminal. As described above, the total delay is computed eliminating individual delay computation errors inside the communication base station and the terminal. In addition, the communication signal propagates at an light speed, and thus, the information supply device can compute the propagation delay time precisely.

As described above, the total delay eliminates an effect of an error in delay computation due to the individual causes described above while including all the delays inside the communication base station, inside the terminal, and between the communication base station and the terminal.

In addition, the information supply device can compute the propagation delay time precisely. Thus, the information supply device can generate the device peculiar delay information while eliminating an effect of an error in delay computation due to the individual causes inside the communication base station and inside the terminal by subtracting the propagation delay time from the total delay.

Further, the information supply device can transmit the device peculiar delay information to a positioning terminal for carrying out positioning based on the communication signal from the communication base station, by the device peculiar delay information transmitting means.

Here, the positioning terminal has a constituent element which is identical to the terminal with respect to reception of the base station timing signal and the communication signal, and thus, a delay of the base station timing signal inside the positioning terminal is in the same range as the terminal. On the other hand, a delay of the base station timing signal inside the communication base station is common in the positioning terminal and the terminal. That is, the device peculiar delay information is also information indicating a delay inside the communication base station and inside the positioning terminal.

Thus, the positioning terminal can reduce an error in positioning computation in the case where the terminal carries out positioning based on the communication signal from the communication base station.

As described above, according to the configuration of the first aspect of the invention, there can be provided a correction value of a transmission timing of a signal from a base station capable of reducing an error in positioning computation using a positioning terminal without a need for a significant system change of the communication base station.

According to a second aspect of the invention, the advantage can be attained by an information supply device communicable with a communication base station, the information supply device comprising: base station position information storage means for storing base station position information indicating a position of the communication base station; current position information receiving means for receiving current position information generated based on satellite signals which are signals from positioning satellites from a terminal via the communication base station; total delay information receiving means for receiving total delay information from the terminal via the communication base station, the total delay information indicating a total delay which is a timing difference between a base station timing signal included in a communication signal from the communication base station and a timing signal of the terminal corrected based on a satellite time which is a time of positioning satellites from the terminal via the communication base station; distance information generating means for generating distance information indicating a distance between a current position of the terminal and a position of the communication base station based on the current position information and the base station position information; propagation delay information generating means for generating propagation delay information indicating a propagation delay time required for the communication signal to propagate the distance; device peculiar delay information for generating device peculiar delay information indicating a delay other than the propagation delay time from among the total delay based on the total delay information and the propagation delay information; and device peculiar delay information transmitting means for transmitting the device peculiar delay information to a positioning terminal for carrying out positioning based on the communication signal from the communication base station, the positioning terminal having a configuration identical to the terminal with respect to reception of the base station timing signal and the communication signal.

According to the configuration of the second aspect of the invention, as in the configuration of the first aspect, it is possible to provide a correction value of a transmission timing of a signal from a communication base station capable of reducing an error in positioning computation using a positioning terminal without a need for significant system change of the communication base station.

According to a third aspect of the invention, it is preferable that the information supply device has: receiving condition information receiving means for receiving condition information indicating a receiving condition of the satellite signals when the current position information has been generated from the terminal; and basic information selecting means for selecting the current position information and the total delay information for use in generating the distance information, the propagation delay information, and the device peculiar delay information from among the current position information and the total delay information received from a plurality of the terminals, based on the receiving condition information in the structure of the second aspect of the invention.

There are various receiving conditions of the satellite signals when the terminal generates the current position information. For example, in the case where a small number of the positioning satellites can be traced or in the case where signal strength of the satellite signals are weak and the receiving condition is poor because of an indoor environment for example, an error of the current position information is large. The error of the current position information is reflected on an error of the distance information which the information supply device generates. Further, the error of the distance information is reflected on the propagation delay information and the device peculiar delay information as well. That is, if the receiving condition is poor and the error of the current position information is large, precision of the device peculiar delay information is also degraded.

In this regard, the information supply device has the basic information selecting means, and thus, can select the current position information and the total delay information for use in generation of the distance information, the propagation delay information, and the device peculiar delay information, from among the current position information and the total delay information received from a plurality of the terminals based on the receiving condition information. Thus, the information supply device can select the current position information and the total delay information generated in the good receiving condition.

In this manner, the information supply device can generate the device peculiar delay information with high precision.

According to a fourth aspect of the invention, it is preferable that the current position information receiving means, the total delay information receiving means, and the receiving condition information means receives the current position information, the total delay information, and the receiving condition information respectively from the terminal at a predetermined time interval in the structure according to the third aspect of the invention.

As described previously, the device peculiar delay information indicates a delay of the base station timing signal inside the information supply device and inside the terminal.

Here, for example, a drift of the information supply device changes depending on a temperature, and is effected by a weather condition or a temperature change within a day as well. Further, parts such as cables or filters configuring the information supply device are degraded with an elapse of time, and a delay of the base station timing signal caused by these parts changes. This situation also applies to the terminal as well.

Therefore, it is desirable to update the device peculiar delay information.

In this regard, according to the configuration of the fourth aspect of the invention, the current position information receiving means, the total delay information receiving means, and the receiving condition information receiving means, of the information supply device, are featured to receive the current position information, the total delay information, and the receiving condition information respectively from the terminal at a predetermined time interval, and thus the device peculiar delay information can be updated at the predetermined interval.

According to a fifth aspect of the invention, the advantage can be attained by a terminal communicable with a communication base station, the terminal comprising: current position information generating means for generating current position information indicating a current position based on satellite signals which are signals from positioning satellites; satellite time information generating means for generating satellite time information indicating a satellite time which is a time of the positioning satellites based on the satellite signals; standard timing signal correcting means for correcting a standard timing signal based on the satellite time information; total delay information generating means for generating total delay information indicating a total delay which is a timing difference between a base station timing signal of the communication base station and the standard timing signal; and basic information transmitting means for transmitting basic information including the current position information and the total delay information to an information supply device for generating device peculiar delay information indicating a delay other than the propagation delay time from among the total delay based on base station position information indicating a position of the communication base station, the total delay information, and the current position information.

According to the configuration of the fifth aspect of the invention, the terminal has the basic information transmitting means, and thus, can transmit basic information including the current position information and the total delay information, the basic information forming a basis for generating the device peculiar delay information, to the information supply device. Then, the information supply device can generate the device peculiar delay information based on the basic information and provide the device peculiar delay information to a positioning terminal for carrying out positioning based on the communication signal.

In this manner, it is possible to provide information that forms a basis for generating a correction value of a transmission timing of a signal from a communication base station capable of reducing an error in positioning computation using a positioning terminal without a need for a significant system change of the communication base station.

According to a sixth aspect of the invention, the advantage can be attained by a control method for controlling an information supply device comprising the steps of: receiving current position information generated based on satellite signals which are signals from positioning satellites via the communication base station by means of an information supply device having base station position information storage means for storing base station position information indicating a position of a communication base station; receiving total delay information indicating a total delay which is a timing difference between a base station timing signal of the communication base station and a standard timing signal of the terminal corrected based on a satellite time which is a time of a positioning satellite from the terminal via the communication base station by means of the information supply device;

generating distance information indicating a distance between a current position of the terminal and a position of the communication base station based on the current position information and the base station position information by means of the information supply device; generating propagation delay information indicating propagation delay time required for the communication signal to propagate the distance by means of the information supply device; and generating device peculiar delay information indicating a delay other than the propagation delay time from among the total delay based on the total delay information and the propagation delay information by means of the information supply device.

According to the configuration of the sixth aspect of the invention, as in the configuration of the first aspect of the invention, it is possible to provide a correction value of a transmission timing of a signal from a communication base station capable of reducing an error in positioning computation using a positioning terminal without a need for a significant system change of the communication base station.

According to a seventh aspect of the invention, the advantage can be attained by a program for controlling an information supply device letting a computer execute the steps of: receiving current position information generated based on satellite signals which are signals from positioning satellites via the communication base station by means of an information supply device having base station position information storage means for storing base station position information indicating a position of a communication base station; receiving total delay information indicating a total delay which is a timing difference between a base station timing signal of the communication base station and a standard timing signal of the terminal corrected based on a satellite time which is a time of a positioning satellite from the terminal via the communication base station by means of the information supply device; generating distance information indicating a distance between a current position of the terminal and a position of the communication base station based on the current position information and the base station position information by means of the information supply device; generating propagation delay information indicating propagation delay time required for the communication signal to propagate the distance by means of the information supply device; and generating device peculiar delay information indicating a delay other than the propagation delay time from among the total delay based on the total delay information and the propagation delay information by means of the information supply device.

According to a eighth aspect of the invention, the advantage can be attained by, a computer readable recording medium for storing a program for controlling an information supply device for letting a computer execute the steps of: receiving current position information generated based on satellite signals which are signals from positioning satellites via the communication base station by means of an information supply device having base station position information storage means for storing base station position information indicating a position of a communication base station; receiving total delay information indicating a total delay which is a timing difference between a base station timing signal of the communication base station and a standard timing signal of the terminal corrected based on a satellite time which is a time of a positioning satellite from the terminal via the communication base station by means of the information supply device; generating distance information indicating a distance between a current position of the terminal and a position of the communication base station based on the current position information and the base station position information by means of the information supply device; generating propagation delay information indicating propagation delay time required for the communication signal to propagate the distance by means of the information supply device; and generating device peculiar delay information indicating a delay other than the propagation delay time from among the total delay based on the total delay information and the propagation delay information by means of the information supply device.

BRIEF DESCRIPTION OF THE DRAWINGS

The invention will be described with reference to the accompanying drawings, wherein like numbers reference like elements.

FIG. 6 is a schematic diagram showing a primary hardware configuration of a positioning terminal;

FIG. 8 is a schematic diagram showing a sending frame FR or the like;

FIG. 11 is an illustrative diagram illustrating an example of a base station positioning method;

FIG. 13 is a schematic flow chart showing an example of operation of a positioning system.

DESCRIPTION OF EXEMPLARY EMBODIMENTS

Hereinafter, with reference to the drawings, the exemplary embodiment(s) of this invention will be described in detail.

The following embodiments are given various limitations that are preferable technically because they are the exemplary specific examples of the invention, however, the scope of the invention is not limited to these aspects unless there is a particular description to limit the invention in the following descriptions.

Figure 1:
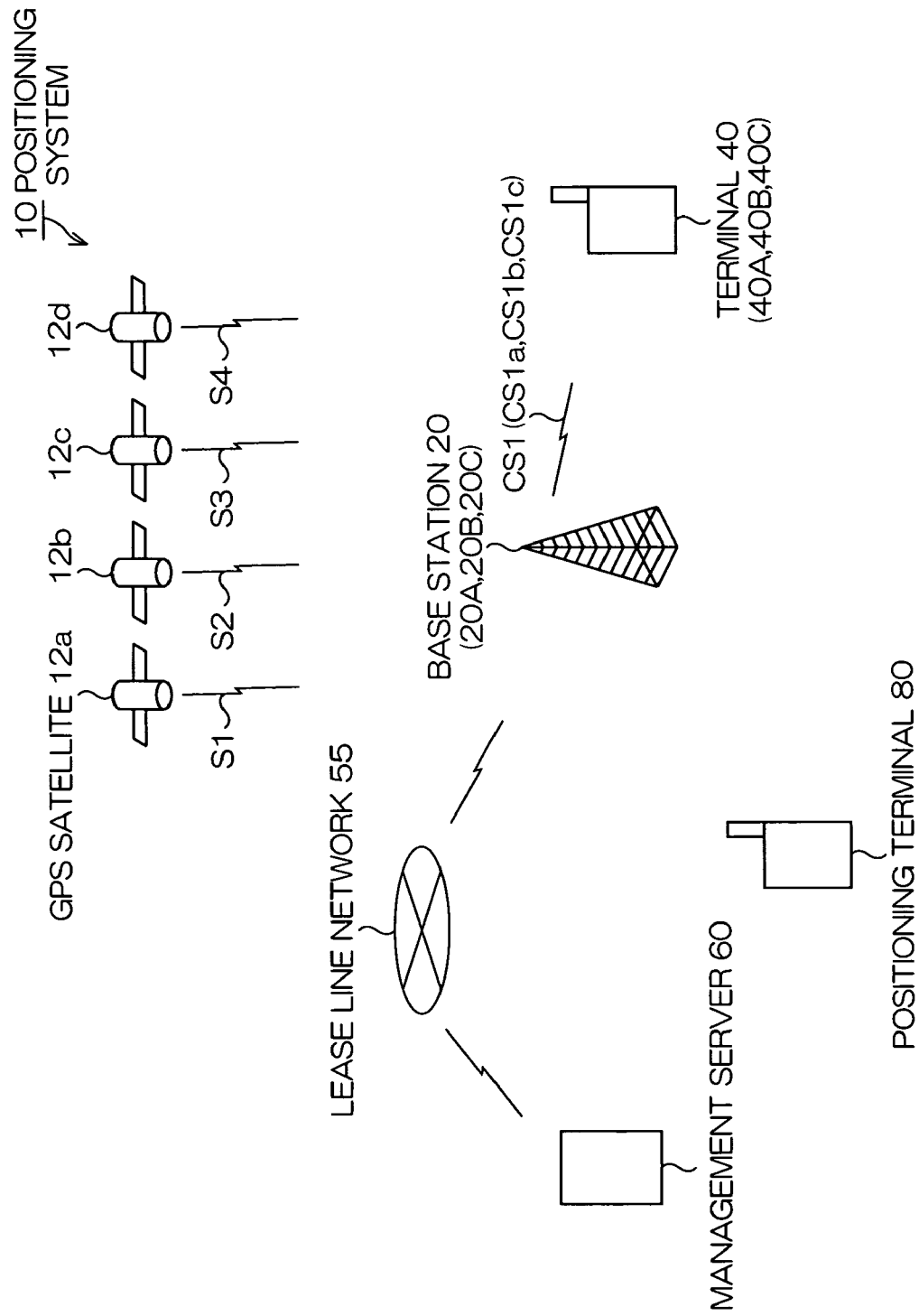
FIG. 1 is a schematic diagram showing a positioning system according to an embodiment of the invention.

FIG. 1 is a schematic diagram showing a positioning system 10 according to an embodiment of the invention.

As shown in FIG. 1, the positioning system has a base station 20. This base station 20 is an example of a communication base station. The base station is, for example, a communication base station of a portable cellular phone network.

The base station 20 transmits a communication signal CS1. The communication signal CS1 is provided as an example of a communication signal.

A plurality of the base station 20 is present. For example, base stations 20A, 20B, and 20C exist in their different positions from each other. The base station 20A or the like transmits communication signals CS1a, CS1b, and CS1c. Hereinafter, it is assumed that the base station 20 is generally referred to as the base station 20A or the like.

The positioning system 10 has a terminal 40 communicable with the base station 20. This terminal 40 is provided as an example of a terminal.

A plurality of the terminal 40 is present. For example, terminals 40A, 40B, and 40C exist. Hereinafter, it is assumed that the terminal 40 is referred to as the terminals 40A or the like.

The positioning system 10 has a management server 60 (hereinafter, referred to as a server 60) communicable with the base station 20 and the terminal 40 via a lease line network 55, for example. The server 60 is an example of an information supply device.

Unlike the present embodiment, the communication network may be the Internet.

The positioning system 10 has a positioning terminal 80. The positioning terminal 80 can carry out positioning based on a communication signal CS1 from the base station 20. That is, the positioning terminal 80 is provided as an example of a positioning terminal.

The base station 20, the terminal 40, and the positioning terminal 80 can receive signals S1, S2, S3, and S4 from GPS satellites 12a, 12b, 12c, and 12d, which are positioning satellites, for example. signals S1, S2, S3 are examples of satellites signals.

The terminal 40 and the positioning terminal 80 are, for example, a portable cellular phone, a PHS (Personal Handyphone System), a PDA (Personal Digital Assistance, etc.).

But The terminal 40 and the positioning terminal 80 are not limited to the above.

Unlike the present embodiment, three or five or more GPS satellites 12a or the like may be provided. In addition, unlike the present embodiment, four or more base stations 20 may be provided, and four or more terminals 40 may be provided.

Primary Hardware Configuration of Base Station 20

Figure 2:
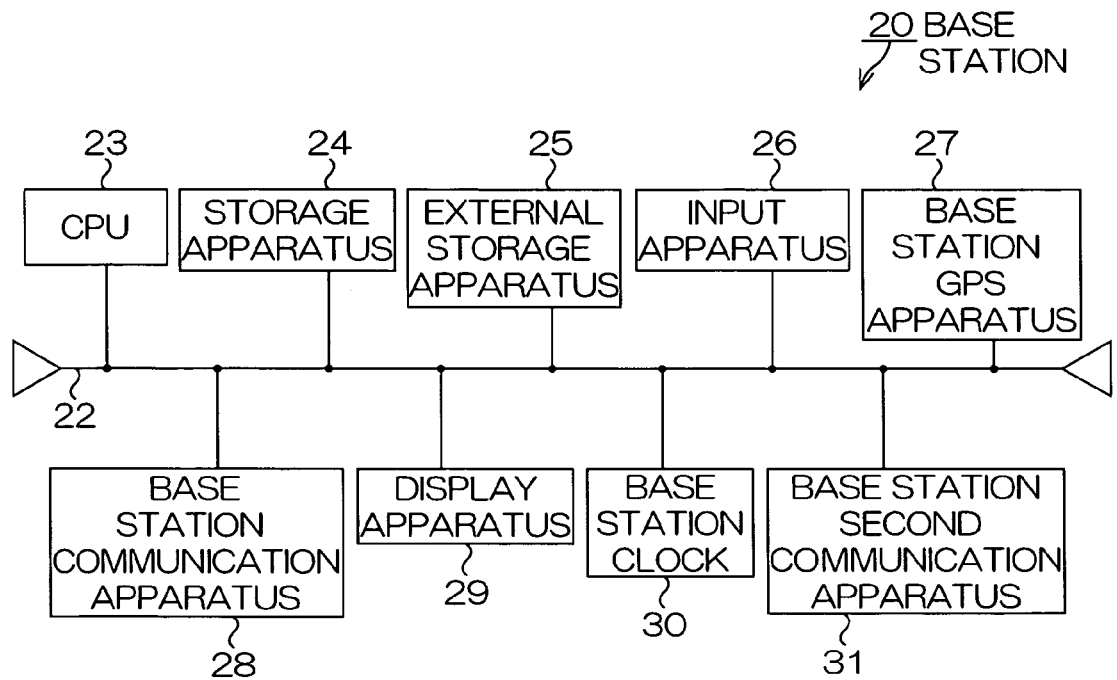
FIG. 2 is a schematic diagram showing a primary hardware configuration of a base station.

FIG. 2 is a schematic diagram showing a primary hardware configuration of the base station 20.

As shown in FIG. 2, the base station 20 has a computer, and the computer has a bus 22.

A CPU (Central Processing Unit) 23, a storage apparatus 24, and an external storage apparatus 25 or the like are connected to this bus 22. The storage apparatus 24 is a RAM (Random Access Memory) or a ROM (Read Only Memory) or the like, for example. The external storage apparatus 25 is a HD (Hard Disk) for example.

In addition, an input apparatus 26 for inputting a variety of information or the like and a base station GPS apparatus 27 are connected to this bus 22. The base station GPS apparatus 27 is a configuration for the base station 20 to receive the signal S1 or the like from the GSP satellite 12a or the like.

In addition, a base station communication apparatus 28 is connected to the bus 22. The base station communication apparatus 28 is a configuration for transmitting the communication signal CS1 for communicating with the terminal 40. The base station 20 transmits a base station timing signal TS1 (refer to FIG. 8) together with the communication signal CS1. This base station timing signal TS1 is an example of a base station timing signal.

Figure 3:
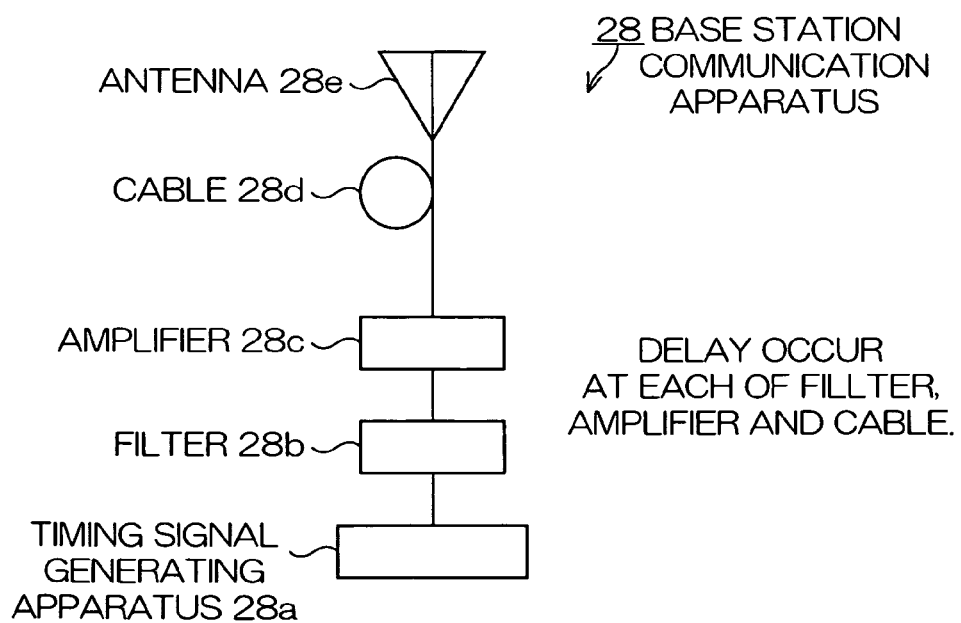
FIG. 3 is a schematic diagram showing an example of a configuration of a base station communication apparatus.

FIG. 3 is a schematic diagram showing a configuration of a base station communication apparatus 28.

As shown in FIG. 3, the base station communication apparatus 28 includes: a timing signal generating apparatus 28a for generating a base station timing signal TS1; a filter 28b, and an amplifier 28c or the like. The base station communication apparatus 28 has a cable 28d for connecting the amplifier 28c and an antenna 28e with each other.

The timing signal generating apparatus 28a has a quartz oscillator, for example, for generating a signal which forms a base of the base station timing signal TS1. A standard frequency of this quartz oscillator is shifted depending on a temperature. Hereinafter, a shift of a frequency of the quartz oscillator depending on a temperature is referred to as a drift. A signal transmission timing of the base station timing signal TS1 is changed (delayed) due to this drift.

In addition, with the base station timing TS1 generated by the timing signal generating apparatus 28a, a delay occurs in the filter 28b, the amplifier 28c, and the cable 28d.

In addition, a display apparatus 29 for displaying a variety of information or the like, a base station clock 30, and a base station second communication apparatus 31 are connected to this bus 22.

Primary Hardware Configuration of Terminal 40

Figure 4:
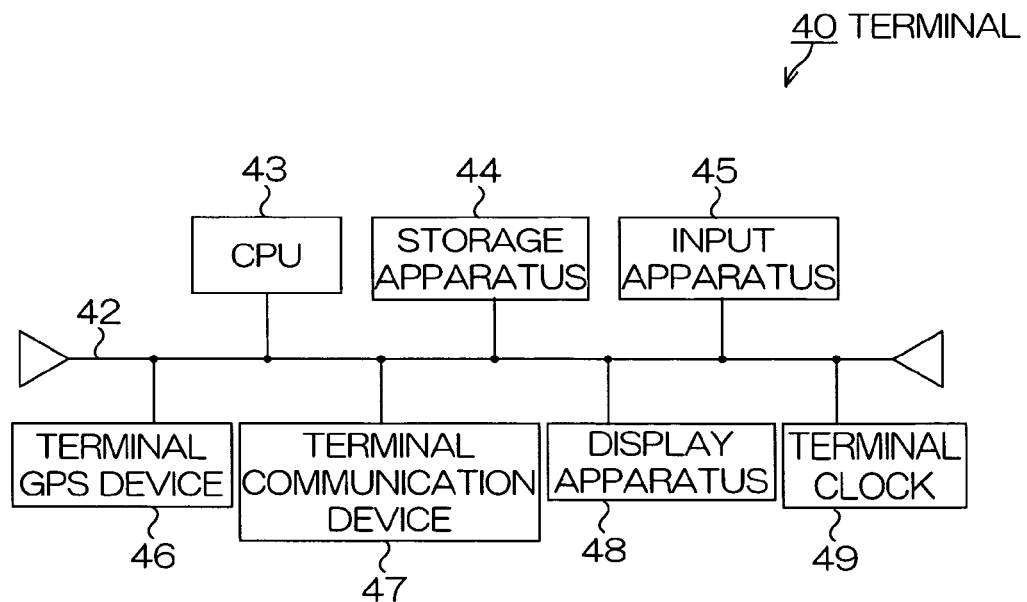
FIG. 4 is a schematic diagram showing a primary hardware configuration of a terminal.

FIG. 4 is a schematic diagram showing a primary hardware configuration of the terminal 40.

As shown in FIG. 4, the terminal 40 has a computer, and the computer has a bus 42.

A CPU 43, a storage apparatus 44, an input apparatus 45, a terminal GPS device 46, a terminal communication device 47, a display apparatus 48, and a terminal clock 49 are connected to this bus 42.

As described later, the terminal clock 49 can be maintained in a state in which there is no difference from a time of the GPS satellite 12a or the like (hereinafter, referred to as a GPS time).

Primary Hardware Configuration of Management Server 60

Figure 5:
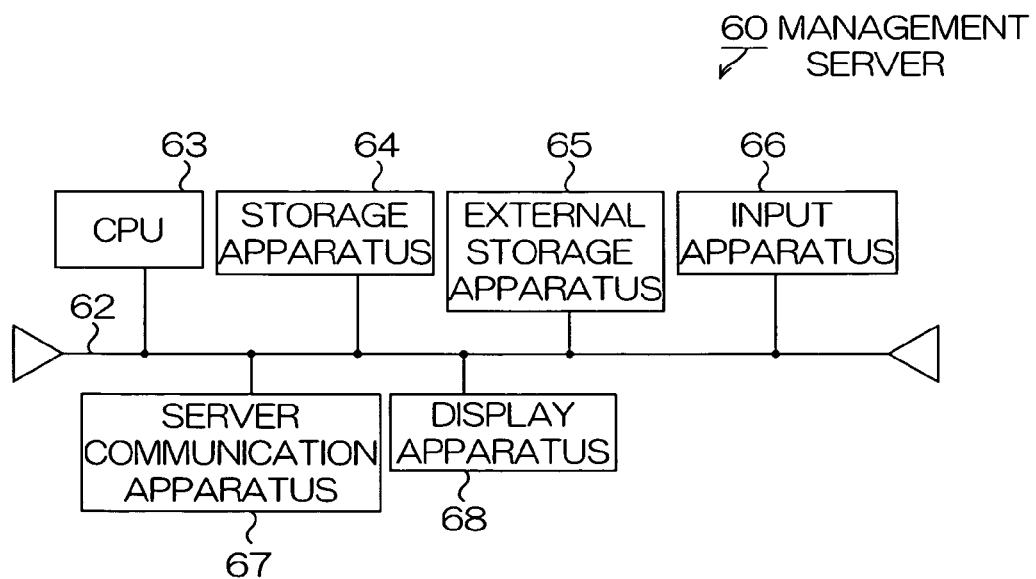
FIG. 5 is a schematic diagram showing a primary hardware configuration of a management server.

FIG. 5 is a schematic diagram showing a primary hardware configuration of the server 60.

As shown in FIG. 5, the server 60 has a computer, and the computer has a bus 62.

A CPU 63, a storage apparatus 64, an external storage apparatus 65, an input apparatus 66, a server communication apparatus 67, and a display apparatus 68 are connected to this bus 62.

Primary Hardware Configuration of Positioning Terminal 80

FIG. 6 is a schematic diagram showing a primary hardware configuration of a positioning terminal 80.

As shown in FIG. 6, the primary hardware configuration of the positioning terminal 80 is identical to that of the terminal 40 described above.

This positioning terminal 80 has the same configuration as the terminal 40 with respect to reception of a base station timing signal TS1 (refer to FIGS. 8A and 8B) and a communication signal CS1 from the base station 20. In addition, this positioning terminal also has the same configuration as the terminal 40 with respect to reception of a signal S1 from the GPS satellite 12a or the like.

Primary Software Configuration of Base Station 20

Figure 7:
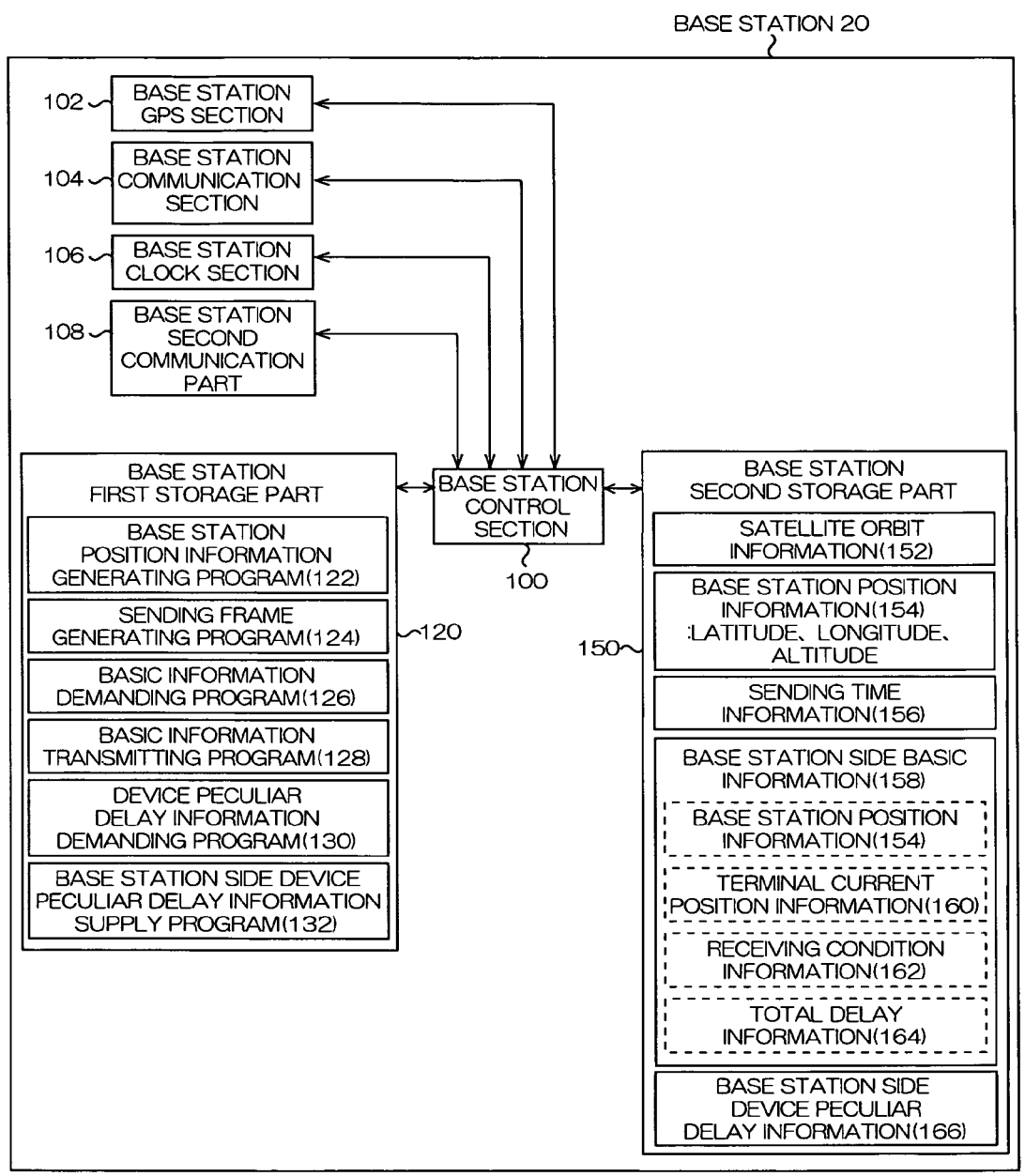
FIG. 7 is a schematic diagram showing a primary software configuration of a base station.

FIG. 7 is a schematic diagram showing a primary software configuration of the base station 20.

As shown in FIG. 7, the base station 20 has: a base station control section 100 for controlling each section; a base station GPS section 102 which corresponds to the base station GPS apparatus 27 shown in FIG. 2; and a base station communication section 104 which corresponds to the base station communication apparatus 28, or the like. This base station communication section 104 is an example of signal transmitting means for transmitting a base station timing signal TS1 and a communication signal CS1.

The base station 20 also has: a base station clock section 106 which corresponds to the base station clock 30 shown in FIG. 2; and a base station second communication part 108 which corresponds to the base station second communication apparatus 31, or the like.

The base station 20 further has: a base station first storage part 120 for storing a variety of programs; and a base station second storage part 150 for storing a variety of information.

As shown in FIG. 7, the base station 20 stores satellite orbit information 152 in the base station second storage part 150. The satellite orbit information 152 includes, for example, Almanac which is schematic orbit information of all the GPS satellites 12a and the like and Ephemeris which is precise orbit information of each of the GPS satellites 12a and the like. The satellite orbit information 152 is used to carry out positioning based on a signal S1 or the like from the GPS satellite 12a or the like.

The base station control section 100 periodically receives a signal S1 or the like from the GPS satellite 12a or the like by means of the base station GPS section 102 so as to sample Almanac and Ephemeris from the signal S1 or the like. Almanac is updated by seven days, for example, Ephemeris is updated by four hours, for example, and they are maintained in an always effective state.

As shown in FIG. 7, the base station 20 stores a base station position information generating program 122 in the base station first storage part 120. The base station position information generating program 122 is a program for generating base station position information 154 indicating a position of the base station 20 based on the signal S1 or the like received by the base station control section 100 through the base station GPS section 102.

Specifically, the base station control section 100 receives signals S1 or the like from four or more GPS satellites 12a or the like by means of the base station GPS section 102. Then, the base station control section 100 computes a difference between a time at which each signal S1 or the like has been transmitted and a time at which each signal S1 or the like has been received; and obtains a distance (herein after referred as pseudo distance) between each of the GPS satellites 12a or the like and the base station 20 based on the fact that a propagation speed of the signal S1 or the like is an light speed. Then, the base station control section 100 computes a position on a satellite orbit, of each of the GPS satellites 12a or the like at a current time by means of Ephemeris included in the satellite orbit information 152. Then, the base station control section 100 generates the base station position information 154 indicating a position of the base station 20, for example, by a latitude, a longitude, and an altitude, based on a pseudo distance of each of the GPS satellites 12a or the like and the position the GPS satellites 12a or the like on the satellite orbit.

The base station control section 100 stores the generated base station position information 154 in the base station second storage part 150.

As shown in FIG. 7, the base station 20 stores a sending frame generating program 124 in the base station first storage part 120. The sending frame generating program 124 is a program for the base station control section 110 to put sending time information 156 on a communication signal CS1.

Figure 8:
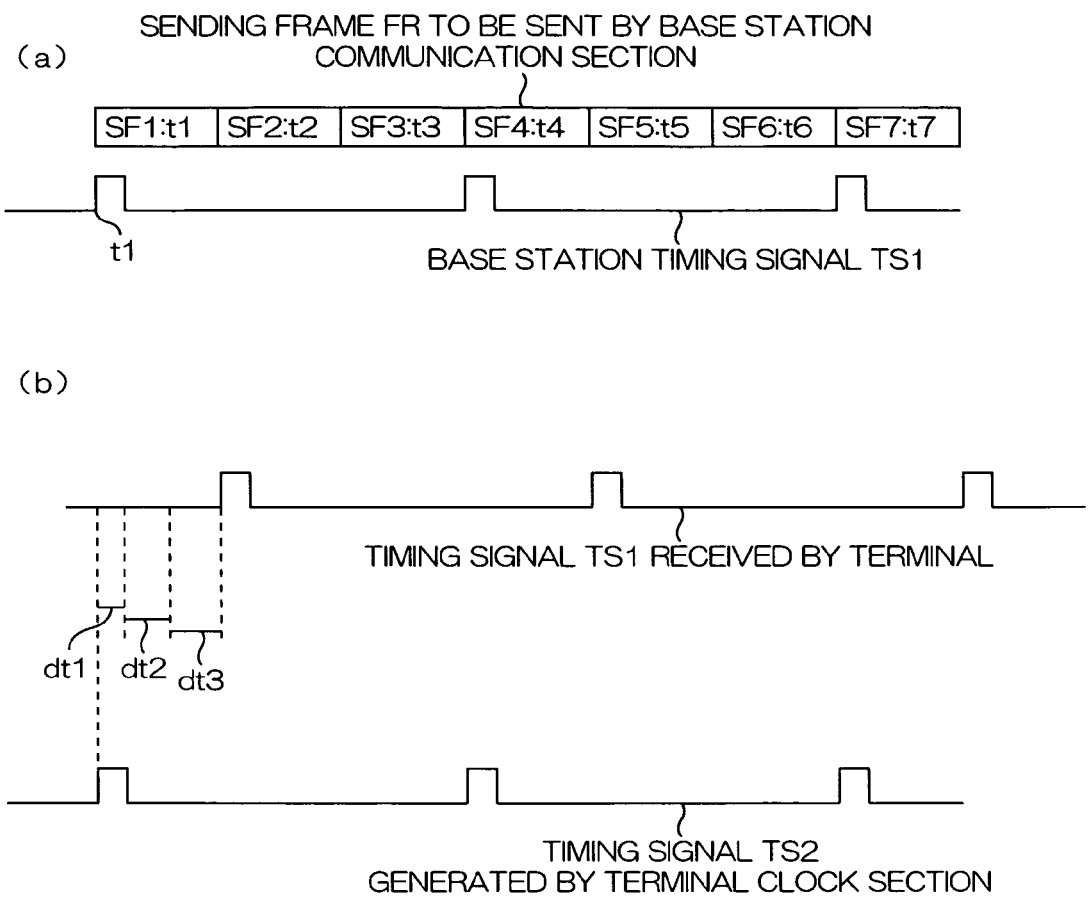

FIG. 8 is a schematic diagram showing a sending frame FR or the like transmitted by the base station communication section 104.

As shown in FIG. 8, the sending frame FR is composed of subsidiary frames SF1 to SF7, for example. Each subsidiary frame SF1 or the like includes information indicating sending times t1 to t7 of each subsidiary frame SF1 or the like. The sending time t1 or the like is clocked by means of a base station clock section 106.

The base station 20 continuously transmits a base station timing signal TS1 together with a communication signal CS1 or the like by means of the base station communication section 104. The base station timing signal TS1 is an example of a base station timing signal. The base station timing signal TS1 is a pulse signal having an interval of one second, for example. The sending time t1 or the like and the base station timing signal TS1 both are provided as information output from the base station clock section 106, and thus, a difference between the sending time t1 or the like and a GPS time is equal to a shift of a transmission timing of the base station timing signal TS1. Assuming that the base station timing signal TS1 is a pulse signal of an interval of one second, the shift of the transmission timing of the base station timing signal TS1 used here denotes a time difference between a pulse interval of an actual base station timing signal ST1 and an interval of one second measured by the GPS time. In the present specification, the shift of the transmission timing of the base station timing signal TS1 is also handled as a delay.

As shown in FIG. 7, the base station 20 stores a basic information demanding program 126 in the base station first storage part 120. The basic information demanding program 126 is a program for requesting basic information 262 described later (refer to FIG. 9) to the terminal 40.

The base station 20 stores the basic information 262 received from the terminal 40 in the base station second storage part 150 as a part of base station side basic information 158. The base station side basic information 158 includes base station position information 154 as well as the information included in the basic information 262 received from the terminal 40.

As shown in FIG. 7, the base station 20 stores a basic information transmitting program 128 in the base station first storage part 120. The basic information transmitting program 128 is a program for the base station control section 100 to transmit the base station side basic information 158 to the server 60.

As shown in FIG. 7, the base station 20 stores a device peculiar delay information demanding program 130 in the base station first storage part 120. The device peculiar delay information demanding program 130 is a program for requesting device peculiar delay information 372 (refer to FIG. 10) relating to the base station 20. Details of the device peculiar delay information 372 are described below. A base station 20A requests the device peculiar delay information 372 relating to the base station 20A; a base station 20B requests the device peculiar delay information 372 relating to the base station 20B; and a base station 20C requests the device peculiar delay information 372 relating to the base station 20C. Thus, each base station 20A or the like requests the device peculiar delay information 372 on each base station 20A or the like itself.

The base station control section 100 stores the device peculiar delay information 372 received from the server 60 in a base station second storage section 150 as the base station side device peculiar delay information 166.

As shown in FIG. 7, the base station 20 stores a base station side device peculiar delay information supply program 132 in the base station first storage part 120. The base station side device peculiar delay information supply program 132 is a program for the base station control section 100 to transmit a base station side device peculiar delay information 166 to a positioning terminal 80.

The base station control section 100 carries out transmission and reception of information by the above described basic information demanding program 126, basic information transmitting program 128, device peculiar delay information demanding program 130, and base station side device peculiar delay information supply program 132 by means of a base station second communication part 108.

Thus, the base station 20 carries out transmission and reception of information by the above described basic information demanding program 126 or the like by means of the base station second communication part 108, and thus, does not require a significant system change of a general communication base station.

Primary Software Configuration of Terminal 40

Figure 9:
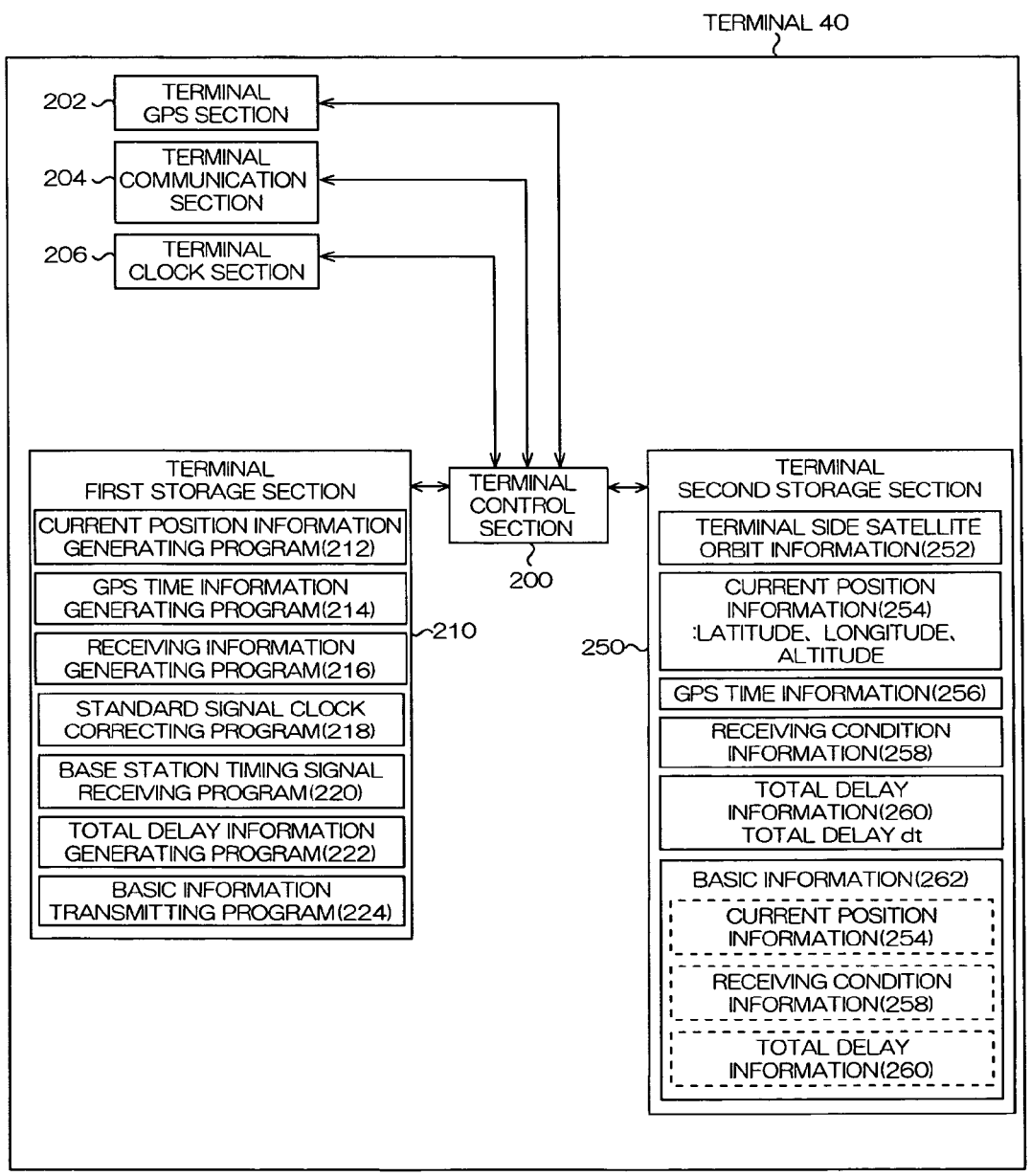
FIG. 9 is a schematic diagram showing a primary software configuration of a terminal.

FIG. 9 is a schematic diagram showing a primary software configuration of the terminal 40.

As shown in FIG. 9, the terminal 40 has: a terminal control section 200 for controlling each section; a terminal GPS section 202 which corresponds to the terminal GPS device 46 shown in FIG. 4; a terminal communication section 204 which corresponds to the terminal communication device 47; and a terminal clock section 206 which corresponds to the terminal clock 49, or the like.

The terminal 40 further has a terminal first storage section 210 for storing a variety of programs and a terminal second storage section 250 for storing a variety of information.

As shown in FIG. 9, the terminal 40 stores terminal side satellite orbit information 252 in the terminal second storage section 250. The terminal side satellite orbit information 252 includes Almanac and Ephemeris, and is maintained in its effective state.

As shown in FIG. 9, the terminal 40 stores a current position information generating program 212 in the terminal first storage section 210. The current position information generating program 212 is a program for the terminal control section 200 to generate current position information 254 indicating a current position based on the signal S1 or the like from the GPS satellite 12a received by the terminal control section 200 by means of the terminal GPS section 202. This current position information 254 is an example of current position information. In addition, the current position information generating program 212 and terminal control section 200 are as a whole an example of current position information generating means.

The current position information 254 is an information indicating a current position of the terminal 40, for example, by a latitude, a longitude, and an altitude.

As shown in FIG. 9, the terminal 40 stores a GPS time information generating program 214 in the terminal first storage section 210. The GPS time information generating program 214 is provided as a program for the terminal control section 200 to generate GPS time information 256 indicating a GPS time based on the signal S1 or the like from the GPS satellite 12a or the like. This GPS time is an example of a satellite time, and the GPS time information 256 is an example of satellite time information. In addition, the GPS time information generating program 214 and terminal control section 200 are as a whole an example of satellite time information generating means.

The terminal control section 200 computes a latitude, a longitude, and an altitude, for example, by means of positioning computation performed based on the current position information generating program 212. At this time, this control section also computes a time error of a terminal clock section 206. Then, the terminal control section 200 computes a GPS time at the time of reception of the signal S1 or the like based on a time measured by the terminal clock section 206 and a time error acquired by positioning.

The terminal control section 200 stores the generated GPS time information 256 in the terminal second storage section 250.

Here, the terminal GPS device 46 (refer to FIG. 4) is composed of parts such as an antenna, a cable, an amplifier, and a filter. After a signal S1 has been received by an antenna, a delay occurs inside the terminal 40. Thus, the GPS time indicated in the GPS time information 256 includes a difference from a true GPS time when the signal CS1 has been received (hereinafter, referred to as a GPS time difference).

The terminals 40A, 40B, and 40C have the same configuration with respect to reception of the signal S1 or the like. Thus, the GPS time difference in terminals 40A, 40B, and 40C are values in the same range.

As shown in FIG. 9, the terminal 40 stores a receiving condition information generating program 216 in the terminal first storage section 210. The receiving condition information generating program 216 is a program for the terminal control section 200 to generate receiving condition information 258 indicating a receiving condition of a signal S1 or the like used for generating the current position information 254. This receiving condition information 258 is an example of receiving condition information.

The receiving condition information 258 is an information indicating all or part of PDOP (Position Dilution Of Precision), signal strength of signal S1 or the like, and the number of received GPS satellites, for example.

The terminal control section 200 stores the generated receiving condition information 258 in the terminal second storage section 250.

As shown in FIG. 9, the terminal 40 stores a standard timing signal correcting program 218 in the terminal first storage section 210. The standard timing signal correcting program 218 is a program for the terminal control section 200 to correct a standard timing signal TS2 generated in the terminal clock section 206 (refer to FIG. 8 (b)) based on an interval of one seconds based on the GPS time indicated in the GPS time information 256, and then, maintain a pulse signal having an interval of one second in GPS time. The standard timing signal TS2 generated in the terminal clock section 206 is an example of a standard timing signal.

As shown in FIG. 9, the terminal 40 stores the base station timing signal receiving program 220 in the terminal first storage section 210. The base station timing signal receiving program 220 is a program for the terminal control section 200 to receive the base station timing signal TS1 from the base station 20 by means of the terminal communication section 204. That is, the base station timing signal receiving program 220 and the terminal control section 200 are means for receiving the base station timing signal.

As shown in FIG. 9, the terminal 40 stores a total delay information generating program 222 in the terminal first storage section 210. The total delay information generating program 222 is a program for the terminal control section 200 to generate total delay information 260 indicating a total delay dt which is a timing difference between a base station timing signal TS1 and a standard timing signal TS2. The total delay information 260 is an example of total delay information.

Specifically, the terminal control section 200, as shown in FIG. 8 (b), measures a difference between a rise of the standard timing signal TS2 and a rise of the base station timing signal TS1 by means of a base station clock section 106, and computes a total delay dt. This total delay dt includes: a delay dt1 due to a drift in the base station communication apparatus 28 (refer to FIG. 3); a cable delay and a device delay dt2 of a respective one of the base station 20 and the terminal 40; and a propagation delay dt3 for propagation of the base station timing signal TS1 from the base station 20 to the terminal 40. Here, a delay obtained by totalizing the delay dt1 due to a drift and the delay dt2 inside the base station 20 and inside the terminal 40 such as a cable delay or a device delay is referred to as a device peculiar delay dmt. The device peculiar delay dmt is obtained by subtracting the propagation delay dt3 from the total delay dt. The device peculiar delay dmt is common in the case where the terminals 40A, 40B, and 40C receive a base station timing signal TS1 from the same base station 20A, for example.

However, it is only the total delay dt that is computed by the terminal 40.

The terminal control section 200 stores the generated total delay information 260 in the terminal second storage section 250.

Then, the terminal control section 200 stores the above described current position information 254, receiving condition information 258, and total delay information 260 in the terminal second storage section 250 as constituent elements of basic information 262.

As shown in FIG. 9, the terminals 40 stores a basic information transmitting program 224 in the terminal first storage section 210. The basic information transmitting program 224 is provided as a program for the terminal control section 200 to transmit the basic information 262 to the base station 20.

The base station 20 having received the basic information 262 from the terminal 40 uses the basic information 262 as part of the base station side basic information 158, as described above. In addition, the base station 20 can transmit the base station side basic information 158 to the server 60. That is, the terminal 40 can transmits the basic information 262 to the server 60 via the base station 20. That is, the basic information transmitting program 224 and terminal control section 200 are as a whole an example of basic information transmitting means.

Primary Software Configuration of Management Server 60

Figure 10:
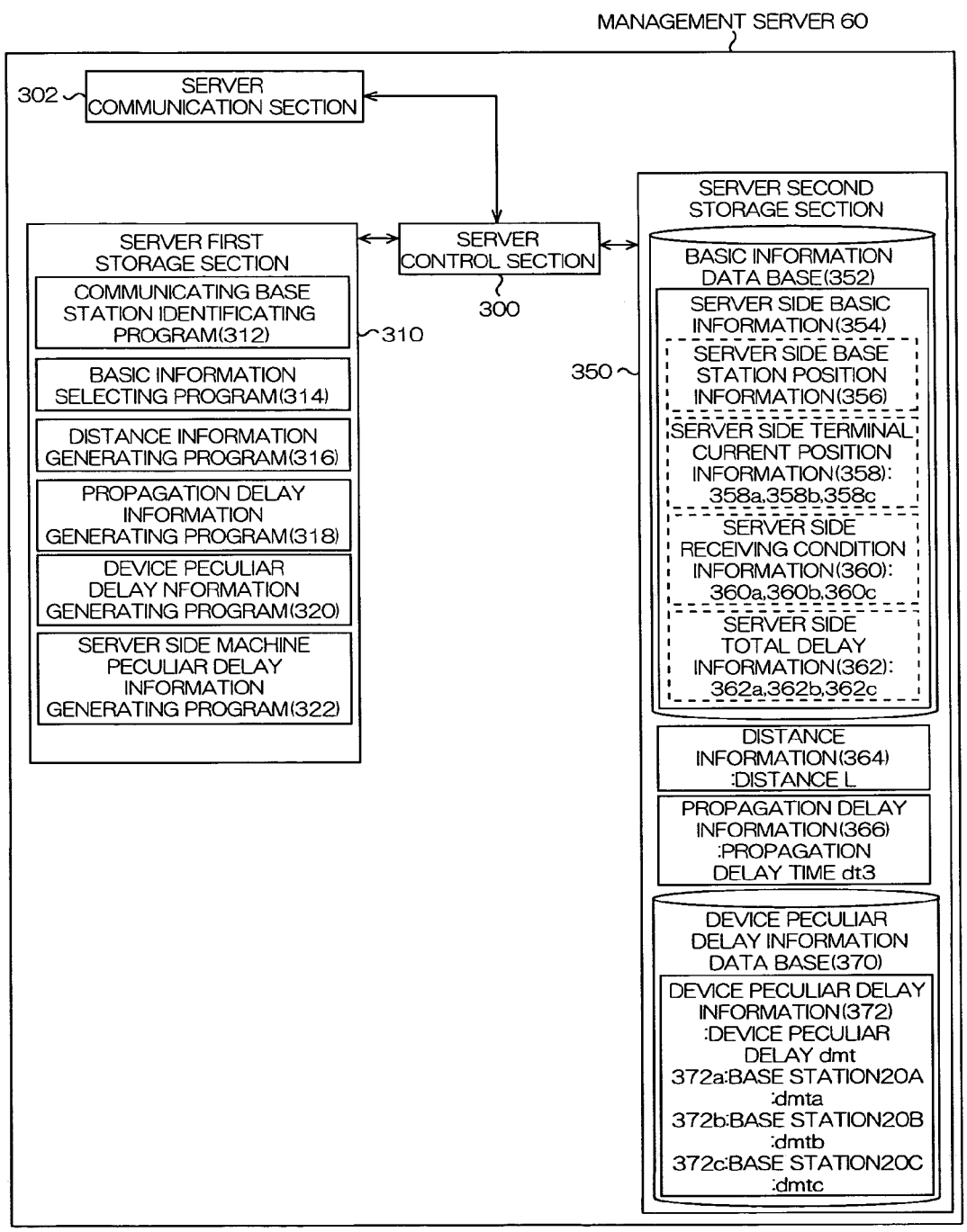
FIG. 10 is a schematic diagram showing a primary software configuration of a management server.

FIG. 10 is a schematic diagram showing a primary software configuration of a server 60.

As shown in FIG. 10, the server 60 has: a server control section 300 for controlling each section; and a server communication section 302 which corresponds to the server communication apparatus 67 shown in FIG. 5, or the like.

The server 60 further has: a server first storage section 310 for storing a variety of programs and a server second storage section 350 for storing a variety of information.

The server 60 receives base station side basic information 158 (refer to FIG. 7) from the base station 20 by means of the server communication section 302. Then, this server stores the base station side basic information 158 as server side basic information 354 in a basic information database 352 of the server second storage section 350. The base station position information 154 shown in FIG. 7 corresponds to the server side base station position information 356 shown in FIG. 10; the terminal current position information 160 corresponds to the server side terminal current position information 358; the receiving condition information 162 corresponds to the server side receiving condition information 360; and the total delay information 164 corresponds to the server side total delay information 362.

The above-described basic information database 352 is an example of base station position information storage means.

In addition, as described above, the base station 20 retains the basic information 262 received from the terminal 40 as a constituent element of the base station side basic information 158, and thus, it is possible to say that the server communication section 302 receives the basic information 262 from the terminal 40 via the communication base station 20. That is, the server communication section 302 is an example of basic information receiving means.

The server control section 300 is designed so as to receive the base station side basic information 158 from the base station 20 at a predetermined time interval, for example, every one minute. This time interval of one minute is an example of a predetermined time interval.

Specifically, the server control section 300 requests the base station side basic information 158 to the base station 20 at a time interval of every one minute. The base station having received a request from the server 60 requests the latest basic information 262 (refer to FIG. 9) to the terminal 40, receives the basic information 262, and defines the received basic information as new base station side basic information 158 (refer to FIG. 7). Then, the base station 20 transmits the new base station side basic information 158 to the server 60.

In this manner, the server 60 can receive the updated base station side basic information 158 at a time interval of every one minute.

As shown in FIG. 10, the server 60 stores a communicating base station identifying program 312 in the server first storage section 310. The communicating base station identifying program 312 is a program for the server control section 300 to specify a base station 20A, for example, with which the terminal 40 is in communication.

For example, the server control section 300 specifies the base station 20A with which the terminal 40 is in communication, based on information for identifying the base station 20A, the information being loaded on a communication signal CS1a from the base station 20A. The information for identifying the base station 20A is an identification number of the base station 20A, for example.

As shown in FIG. 10, the server 60 stores a basic information selecting program 314 in the server first storage section 310. The basic information selecting program 314 is a program for the server control section 300 to select the server side terminal current position information 358 and server side total delay information 362 for use in generation of distance information 364, propagation delay information 366, and device peculiar delay information 372 described later, from among the server side terminal current position information 358 and server side total delay information 362 relating to a plurality of terminals 40A or the like, based on the server side receiving condition information 360. That is, the basic information selecting program 314 and the server control section 300 are as a whole an example of basic information selecting means.

The server 60 stores server side receiving condition information 360a, 360b, and 360c relating to terminals 40A, 40B, and 40C respectively, for example, in the basic information database 352. In addition, the server 60 stores server side terminal current position information 358a, 358b, and 358c and items of total delay information 362a, 362b, and 362c for the terminal 40A or the like in the basic information database 352.

If the server side receiving condition information 360 indicates PDOP, in the case where the server side receiving condition information 360a indicates the smallest PDOP, for example, the server control section 300 selects the server side terminal current position information 358a and the total delay information 362a for the terminal 40A.

As shown in FIG. 10, the server 60 stores a distance information generating program 316 in the server first storage section 310. The distance information generating program 316 is a program for the server control section 300 to generate distance information 364 indicating a distance L between a current position of the terminal 40A and a position of the base station 20, based on the server side terminal current position information 358a and the server side base station position information 356. The distance information 364 is an example of distance information. In addition, the distance information generating program 316 and the server control section 300 are as a whole an example of distance information generating means.

Specifically, the server control section 300 generates the distance information 364 by computing the distance L between a coordinate of the base station 20 indicated in the server side base station position information 356 and a coordinate of the terminal 40A indicated in the server side terminal current position information 358a.

The server control section 300 stores the generated distance information 364 in the server second storage section 350.

In the case where the server side receiving condition information 360a indicates the smallest PDOP, the server control section 300 selects the server side terminal current position information 358a for the terminal 40A by means of the above described basic information selecting program 314. Thus, a positioning error of the terminal 40A indicated in the server side terminal current position information 358a is smaller than a positioning error of the terminals 40B and 40C.

Thus, the server control section 300 can generates distance information 364 whose error is the smallest.

As shown in FIG. 10, the server 60 stores a propagation delay information generating program 318 in the server first storage section 310. The propagation delay information generating program 318 is a program for the server control section 300 to generate propagation delay information 366 indicating a propagation delay time dt3 required for a communication signal CS1 to propagate the distance L indicated by the distance information 364. That is, the propagation delay information generating program 318 and the server control section 300 are as a whole an example of propagation delay information generating means.

Specifically, a speed of the communication signal CS1 to propagate is an light speed, and thus, the server control section 300 computes the propagation delay time dt3 by dividing the distance L by the light speed.

The server control section 300 stores the generated propagation delay information 366 in the server second storage section 350.

As described above, the server control section 300 can generate distance information 364 whose error is the smallest, and thus, an error of the propagation delay information 366 is also the smallest.

As shown in FIG. 10, the server 60 stores a device peculiar delay information generating program 320 in the server first storage section 310. The device peculiar delay information generating program 320 is a program for the server control section 300 to generate device peculiar delay information 372 indicating a delay other than the propagation delay time dt3, based on the server side total delay information 362 and the propagation delay information 366. This device peculiar delay information 372 is provided as an example of device peculiar delay information. In addition, the device peculiar delay information generating program 320 and the server control section 300 are as a whole an example of device peculiar delay information generating means.

Specifically, the server control section 300 computes a device peculiar delay dmt by subtracting a propagation delay time dt3 from a total delay dt (refer to FIG. 8 (b)).

The server control section 300 stores the generated device peculiar delay information 372 in a device peculiar delay information database 370 of the server second storage section 350.

The server control section 300 generates device peculiar delay information 372a, 372b, and 372c relating to base stations 20A, 20B, and 20C, respectively. The constituent elements relating to transmission of a base station timing signal TS1 inside the base stations 20A, 20B, and 20C are not always identical to each other, and thus, delay times of the base station timing signal TS1 inside the base stations 20A, 20B, and 20C are not always equal to one another. Therefore, the device peculiar delays dmta, dmtb, and dmtc indicated in device peculiar delay information 372a, 372b, and 372c relating to the base stations 20A, 20B, and 20C are not always equal to each other.

In contrast, for example, in terminals 40A, 40B, and 40C, the constituent elements relating to reception of the base station timing signal TS1 are identical to each other, and thus, the delay times of the base station timing signal TS1 inside the terminals 40A, 40B, and 40C are equal to each other. In addition, an only difference in terminals 40A, 40B, and 40C is a propagation delay time dt3 (refer to FIG. 8 (b)). Thus, as long as the base station 20 is common, for example, a base station 20A, the device peculiar delay dmt computed by subtracting the propagation delay time dt3 from the total delay dt is equal with respect to the terminals 40A, 40B, and 40C.

As described above, the base station 20 can receive the above device peculiar delay information 372 from the server 60 and store base station side device peculiar delay information 166 (refer to FIG. 7) in a base station second storage part 150.

Then, a positioning terminal 80 can receive the base station side device peculiar delay information 166 from the base station 20 and carry out positioning (hereinafter, referred to as base station positioning) based on a communication signal CS1a or the like from a plurality of base stations 20A or the like. In the case where it is judged that communication with the base station 20B has been switched to communication with the base station 20A (in the case where it is judged that handover has occurred) or in the case where power has been supplied for startup, the positioning terminal 80 is designed to acquire the base station side device peculiar delay information 166 (refer to FIG. 7) from the base station 20A.

FIG. 11 is a illustrative diagram showing an example of a base station positioning method.

FIG. 11 (a) is a diagram showing a position of each base station 20A or the like. The position of each base station 20A or the like is already known.

FIG. 11 (b)d is a diagram showing a propagation time tb01 or the like of a communication signal CS1a or the like from each base station 20A or the like. The propagation time tb01 or the like is an unknown quantity.

FIG. 11 (c) is a diagram showing a sending time t1 or the like of each communication signal CS1a or the like. The sending time t1 or the like is already known. Here, t1, t2, and t3 are not always identical to each other.

FIG. 11 (d) is a diagram showing a device peculiar delay dmta or the like which is a total of a delay inside the base station 20A or the like and a delay inside a terminal. The device peculiar delay dmta or the like is already known.

FIG. 11 (e) is a diagram showing a propagation speed of a communication signal CS1a or the like. The communication signal CS1a or the like is putted on a radio wave, and thus, its propagation speed is an light speed C.

FIG. 11 (f) is a diagram showing a time difference td01 or the like between a sending time t1 of the communication signal CS1a or the like and a time at which the positioning terminal 80 has received the communication signal CS1a or the like. As shown in FIG. 11 (g), a time at which the positioning terminal 80 has received the communication signal CS1*a* or the like is defined as t0.

A position (X, Y, Z) of the positioning terminal 80 shown in FIG. 11 (*h*) is an unknown quantity.

On the presumption of the foregoing description, a description will be given with respect to formulas (1) to (9) shown in FIGS. 11 (*i*) to 11 (*k*).

First, a distance between each base station 20A or the like and the positioning terminal 80 is equal to a value obtained by multiplying a propagation time of a communication signal CS1*a* or the like and a speed of a radio wave (light speed C) by each other, and thus, formulas (1) to (3) shown in FIG. 11 (*i*) are established.

Next, a reception time of a communication signal CS1*a* or the like is a time at which a propagation time tb01 or the like and a device peculiar delay dtma or the like has elapsed from a sending time t1 or the like, and thus, formulas (4) to (6) shown in FIG. 11 (*j*) are established.

Further, with respect to the time difference td01 or the like shown in FIG. 11 (*f*), formulas (7) to (9) shown in FIG. 11 (*k*) are established based on a sending time t1 or the like shown in FIG. 11 (*c*), the propagation time tb01 shown in FIG. 11 (*b*), and a time t0 shown in FIG. 11(*g*).

In the formulas, there are six unknown quantities X, Y, and Z indicating positions of the positioning terminal 80 and the propagation times tb01, tb02, and tb03, and thus, all of the unknown quantities can be computed by solving simultaneous equations (1), (2), (3), (7), (8), and (9).

The above base station positioning presumes that the positioning terminal 80 is communicable with the base station 20A or the like, and thus, this terminal is positioned in the communication coverage of the base station 20A or the like. Thus, in the case where the positioning terminal 80 is positioned in a less irregular region and an altitude component Z1 or the like of the position of the base station 20A or the like (refer to FIG. 11 (*a*)) is substantially equal to one another, for example, the above described base station positioning can be carried out while an average value of the altitude components Z1, Z2, and Z3 is defined as an altitude component Z of the position of the positioning terminal 80.

In addition, the positioning terminal 80 can carry out positioning (referred to as hybrid positioning) based on both of the communication signal CS1*a* or the like and the signal S1 or the like from the GPS satellite 12*a* or the like.

The positioning terminal 80 carries out hybrid positioning while substituting the GPS satellite 12*a* or the like by one or two base stations 20 in the base station positioning computation method described above with respect to FIG. 11.

In general, positioning using artificial satellites, positioning mobile communication information, or a positioning method using two or more sensors such as an acceleration sensor using gyroscope and a vehicle speed pulse sensor is referred to as hybrid positioning. However, in the present embodiment, positioning carried out by using a combination of information on the base station 20A or the like and information on the GPS satellite 12*a* or the like is referred to as hybrid positioning.

In addition, the positioning terminal 80 carries out positioning based only on a signal S1 or the like (hereinafter, referred to as satellite positioning) in the case where it can receive the signal S1 or the like from three or more GPS satellites 12*a* or the like.

In general, positioning precision of positioning based on the signal S1 or the like from the GPS satellites 12*a* or the like is higher than that of positioning based on the communication signal CS1. For example, in the case of satellite positioning, a positioning error ranges from 0 to 20 meters. On the other hand, in the case of base station positioning, the positioning error ranges from 5 to 400 meters.

In this regard, the positioning terminal 80 can carry out positioning by using only the signal S1 or the like or both of the signal S1 or the like and the communication signal CS1 as long as it can receive the signal S1 or the like from the GPS satellites 12*a* or the like.

Thus, the positioning terminal 80 can carry out positioning in the highest positioning precision in accordance with the number of GPS satellites 12*a* or the like which are in the sky and observable.

In contrast, for example, in an environment in which three or more GPS satellites 12*a* or the like cannot be observed, such as an indoor environment, hybrid positioning or base station positioning can be carried out by using a communication signal CS1 which can be received even in the indoor environment.

The positioning system 10 is configured as described above.

As has been described above, the base station 20 can transmit the base station timing signal TS1 and the communication signal CS1 generated by the base station 20.

It is general that a communication base station transmits a communication signal including a timing signal, and thus, the communication base station does not need a significant system change of a general communication base station.

In addition, the terminal 40 can generate total delay information 260. A total delay dt is obtained as a timing difference between a base station timing signal TS1 and a standard timing signal TS2 corrected based on a GPS time. This total delay dt includes: a delay due to a drift when the base station timing signal ST1 is generated in the base station 20; and a delay in the base station 20 from generation to transmission of the base station timing signal TS1 in the base station 20.

In addition, the total delay dt includes a propagation delay time dt3 required for the base station timing signal TS1 to arrive from the base station 20 to the terminal 40.

Further, the total delay dt includes: a delay inside the terminal 40 caused by the base station timing signal TS1 passing through a cable, a filter or the like after the signal has arrived at an antenna of the terminal 40.

Furthermore, the total delay dt includes a delay of the standard timing signal TS2 itself as well. Although the standard timing signal TS2 is corrected by the GPS time, the signal S1 or the like itself from the GPS satellite 12*a* or the like delays inside the terminal 40. As a result, with the standard timing signal ST2 as well, a delay occurs as compared with a timing of a true GPS time.

As described above, the total delay dt includes all the delays, i.e., a delay inside the base station 20, a propagation delay dt3 between the base station 20 and the terminal 40 and a delay inside the terminal 40. In computation of the total delay dt, the terminal 40 does not need to compute individual delays such as a delay caused by a drift or a cable inside the base station 20, for example, and does not need to compute individual delays inside the terminal 40. This implies that an effect of an error in individual delay computations inside the base station 20 and inside the terminal 40 and an effect of an error in propagation delay computation can be eliminated. That is, the total delay dt eliminates an effect of an error in delay computation due to the individual causes described above while including all of the delays inside the base station 20, inside the terminal 40, and between the base station 20 and the terminal 40.

On the other hand, the server 60 can receive base station side basic information 158 (refer to FIG. 7) from the base station 20.

In addition, the server 60 can generate distance information 364 (refer to FIG. 10).

In addition, the server 60 can generate propagation delay information 366.

Further, the server 60 can generate device peculiar delay information 372.

The above described device peculiar delay information 372 is a delay other than the propagation delay dt3, and thus, is provided as information indicating delays inside the base station 20 and inside the terminal 40. As described above, the total delay dt is computed while eliminating individual computation errors inside the base station 20 and the terminal 40. In addition, the communication signal CS1 propagates at an light speed so that the server 60 can compute the propagation delay time dt3 precisely.

As described above, the total delay dt eliminates an effect of a delay computation error due to the individual causes described above while including all of the delays inside the base station 20, inside the terminal 40, and between the base station 20 and the terminal 40.

In addition, the server 60 can compute the propagation delay time dt3 precisely. Thus, this server 60 can generate device peculiar delay information 372 while eliminating an effect of a delay computation error due to the individual causes inside the base station 20 and inside the terminal 40 by subtracting the propagation delay time dt3 from the total delay dt.

Further, the server 60 can transmit the device peculiar delay information 372 via the base station 20 to the positioning terminal 80 for carrying out positioning based on the communication signal CS1 from the base station 20.

Here, the positioning terminal 80 has the same constituent elements as the terminal 40 with respect to reception of the communication signal CS1, and thus, a delay of the base station timing signal TS1 inside the positioning terminal 80 is in the same range as that of the terminal 40. On the other hand, a delay of the base station timing signal TS1 inside the base station 20 is common in the positioning terminal 80 and the terminal 40. That is, the device peculiar delay information 372 is also provided as information indicating delays inside the base station 20 and inside the positioning terminal 80.

Thus, the positioning terminal 80 can reduce an error of positioning computation in the case where the positioning terminal 80 carries out positioning based on the communication signal CS1a or the like from the plurality of base stations 20a by using the device peculiar delay information 372.

As described above, according to the positioning system 10, it is possible to provide a correction value of a transmission timing of a signal from a communication base station capable of reducing an error in positioning computation using a positioning terminal without a need for a significant system change of the communication base station.

In addition, there are a variety of receiving conditions of a GPS signal S1 or the like when the terminal 40 generates current position information 254 (refer to FIG. 9). For example, in the case where a small number of the GPS satellites 12a or the like can be traced or in the case where signal strength of the GPS signal S1 or the like is weak and the receiving condition is poor in an indoor environment, an error of the current position information 254 is large. The error of the current position information 254 is reflected on an error of the distance information 364 (refer to FIG. 10) generated by the sever 60. Further, this error is reflected on the propagation delay information 366 and the device peculiar delay information 372 as well. That is, if the receiving condition is poor and the error of the current position information 254 is large, precision of the device peculiar delay information 372 is also degraded.

In this regard, the server 60 can select information for use in generation of the distance information 364, propagation delay information 366, and device peculiar delay information 372 from among the server side terminal current position information 358 and server side total delay information 362 relating to a plurality of terminals 40 based on the server side receiving condition information 360 (refer to FIG. 10). Thus, the server 60 can select the server side terminal current position information 358 and server side total delay information 362 generated in a good receiving condition.

In this manner, the server 60 can generate device peculiar delay information 372 with high precision. As a result, the positioning terminal 80 can improve the positioning precision of base station positioning and hybrid positioning carried out by using the base station side device peculiar delay information 166 (refer to FIG. 7).

As described above, the device peculiar delay information 372 indicates a delay of the base station timing signal TS1 inside the server 60 and inside the terminal 40.

Here, for example, a drift of the server 60 changes depending on a temperature, and is subjected to a weather condition or a temperature change within a day. Further, parts such as cables or filters configuring the server 60 are degraded with an elapse of time, and a delay of the base station timing signal TS1 is changed by these parts changes. This situation also applies to the terminal 40.

Therefore, it is desirable that the device peculiar delay information 372 be updated.

In this regard, the server 60 is featured to receive the updated base station side basic information 158 from the base station 20 at predetermined time intervals, for example, every one minute, so that the device peculiar delay information 372 can be updated at the predetermined time intervals.

The description of the configuration of the positioning system 10 according to the present embodiment has now been completed. Hereinafter, an example of an operation of the system will be described primarily with reference to FIGS. 12 and 13.

Figure 12:
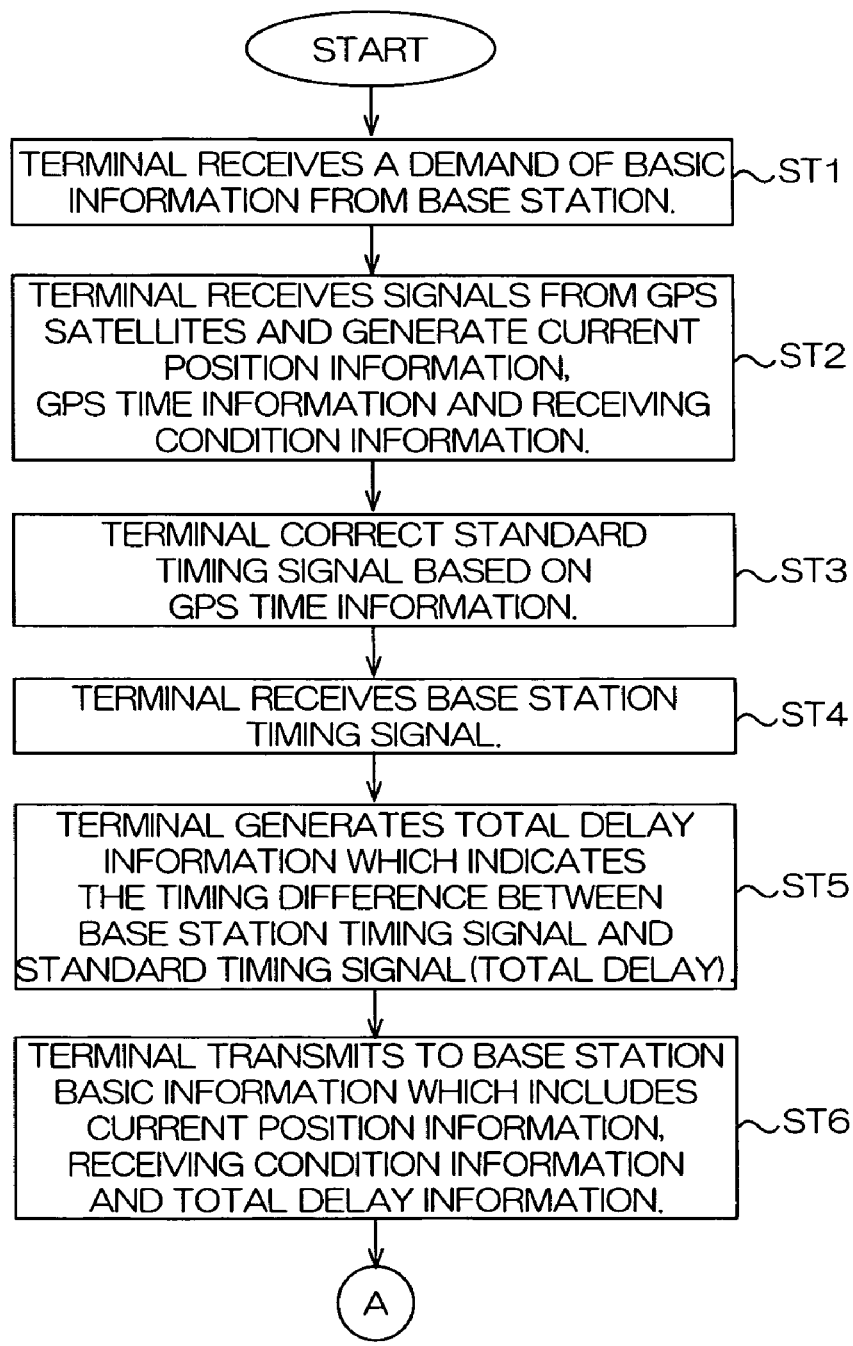
FIG. 12 is a flow chart showing an example of operation of a positioning system.

FIGS. 12 and 13 are schematic flow charts each showing an example of an operation of the positioning system 10 according to the present embodiment.

First, the terminal 40 receives a request of basic information 262 (refer to FIG. 9) from the base station 20 (step ST1 of FIG. 12).

Next, the terminal 40 receives a signal S1 or the like from GPS satellites 12a or the like, and generates current position information 254, GPS time information 256, and receiving condition information 258 (step ST2).

Then, the terminal 40 corrects a standard timing signal TS2 (refer to FIG. 8 (b)) based on the GPS time information 256 (step ST3).

Then, the terminal 40 receives a base station timing signal TS1 (step ST4).

Then, the terminal 40 generates total delay information 260 (refer to FIG. 9) indicating a timing difference between the base station timing signal TS1 and the standard timing signal TS2 (step ST5).

Then, the terminal 40 generates the basic information 262 including current position information 254, receiving condition information 258, and total delay information 260 with respect to the base station 20 (step ST6).

Then, the base station 20 receives basic information 262 from the terminal 40 (step ST7 of FIG. 13).

Then, the base station 20 transmits base station side basic information 158 (refer to FIG. 7) to the server 60 (step ST8).

Then, the server 60 receives the base station side basic information 158 from the base station 20 (step ST9). This step ST9 is an example of the step of receiving current position information and an example of the step of receiving total delay information.

Then, the server 60 selects server side terminal current position information 358 and server side total delay information 362 which correspond to the terminal 40 which is the best in receiving condition shown in the server side receiving condition information 360 (refer to FIG. 10) (step ST10).

Then, the server 60 generates distance information 364 (refer to FIG. 10) indicating a distance L between a position of the terminal 40 indicated in the server side terminal current position information 358 and a position of the base station 20 indicated in the server side base station position information 356 (step ST11). This step ST11 is an example of the step of generating distance information.

Then, the server 60 generates propagation delay information 366 indicating a propagation delay time dt3 by dividing the distance L indicated in the distance information 364 by an light speed (step ST12). This step ST12 is an example of the step of generating propagation delay information.

Then, the server 60 subtracts the propagation delay time dt3 from a total delay dt indicated in the server side total delay information 362, and generates device peculiar delay information 372 indicating a device peculiar delay dmt (refer to FIG. 8B (step ST13)). This step ST13 is an example of the step of generating device peculiar delay information.

The server 60 can supply the thus generated device peculiar delay information 372 to the positioning terminal 80 via the base station 20.

As described above, in the positioning system 10, the server 60 can generate the device peculiar delay information 372 indicating a total of a delay inside the base station 20 and a delay inside the terminal 40, and supply the generated information to the positioning terminal 80 via the base station 20.

Then, the positioning terminal 80 carries out positioning based on the communication signal C1 sent from the base station 20 established in asynchronous communication. At this time, this positioning terminal 80 uses the device peculiar delay information 372 acquired from the server 60. In this manner, the precision of positioning computation of the positioning terminal 80 can be improved.

As has been described above, according to the positioning system 10, it is possible to provide a correction value of a transmission timing of a signal from a communication base station capable of reducing an error of positioning computation using the positioning terminal without a need for a significant system change of the communication base station.

Program and Computer Readable Recording Medium or the Like

An information supply device control program can be provided, the program causing a computer to execute the step of receiving current position information; the step of receiving total delay information; the step of generating distance information; the step of generating propagation delay information; and the step of generating device peculiar delay information or the like, included in the above described example of operation.

In addition, a computer readable recording medium or the like can be provided, the medium having recorded therein such an information supply device control program or the like.

A program storage medium to be used for installing the control program or the like of the information supply device and making it so as to be executed by the computer can be realized, for example, not only by a package media such as a flexible disk such as a floppy (registered trademark) and a CD-ROM (Compact Disc Read Only Memory), a CD-R (Compact Disc-Recordable), a CD-RW (Compact Disc-Rewritable), and a DVD (Digital Versatile Disc) or the like but also by a semiconductor memory, a magnetic disk or a magnetic optical disk for temporally or permanently storing the program therein.

The invention is not limited to the above-described respective embodiments. Further, the above-described respective embodiments may be combined with each other.

What is claimed is:

1. A positioning system, comprising:
   a communication base station;
   a terminal communicable with the communication base station; and
   an information supply device communicable with the communication base station and the terminal,
   the communication base station including a signal transmitting section that transmits a base station timing signal to the terminal, the base station timing signal being a signal at a predetermined time interval,
   the terminal including
      a local clock, a time error of the local clock being calibrated at any time based on a satellite time of positioning satellites,
      a positioning section that locates a current position based on satellite signals that are signals from the positioning satellites,
      a receiving section that receives the base station timing signal,
      a total delay time calculating section that calculates a timing difference between the base station timing signal and a standard timing signal indicated by the local clock as a total delay time that includes a drift of the local clock depending on a temperature, a delay time based on signal processing in the communication base station and the terminal, and a propagation delay time between the communication base station and the terminal, and
      a basic information transmitting section that transmits basic information including the position located by the positioning section and the total delay time to the information supply device via the communication base station,
   the information supply device including
      a base station position information storage section that stores base station position information indicating a position of the communication base station,
      a basic information receiving section that receives the basic information including the position located by the positioning section and the total delay time from the terminal via the communication base station,
      a propagation delay time calculating section that calculates a distance between the terminal and the communication base station based on the position located by the positioning section and the base station position information to calculate a propagation delay time required for a signal to propagate the distance,
      a device peculiar delay time calculating section that calculates a delay time other than the propagation delay time as a device peculiar delay time by subtracting the propagation delay time from the total delay time, a device peculiar delay time transmitting section that transmits the device peculiar delay time to a positioning terminal that carries out positioning using a net propagation delay time so that the positioning terminal calculates the net propagation delay time, the positioning terminal having a configuration identical to the terminal with respect to reception of the base station timing signal.

2. A terminal comprising:

a local clock, a time error of the local clock being calibrated at any time based on a satellite time of positioning satellites;

a positioning section that locates a current position based on satellite signals that are signals from positioning satellites;

a receiving section that receives a base station timing signal from a communication base station that transmits the base station timing signal, the base station timing signal being a signal at a predetermined time interval;

a total delay time calculating section that calculates a timing difference between the base station timing signal and a standard timing signal the local clock as a total delay time that includes a drift of the local clock depending on the temperature, a delay time based on signal processing in the communication base station and the terminal, and a propagation delay time between the communication base station and the terminal; and a basic information transmitting section that transmits basic information including the total delay time and the position located by the positioning section to an information supply device via the communication base station based on base station position information that indicates a position of the communication base station, the total delay time, and the position located by the positioning section, the information supply device calculating a device peculiar delay time that is a delay time other than the propagation delay time.

3. The positioning system according to claim 1, wherein the terminal includes a receiving condition determination section that determines a receiving condition of the satellite signals when the positioning section locates the current position, the basic information transmitting section of the terminal transmits the information that further includes the receiving condition to the information supply device, the basic information receiving section of the information supply device receiving the basic information from each of a plurality of the terminals, the information supply device further includes a best receiving condition terminal determination section that determines a terminal with a best receiving condition among a plurality of the terminals that have transmitted the basic information received by the basic information receiving section based on the receiving condition included in the basic information, the propagation delay time calculating section of the information supply device calculates the propagation delay time based on the position located by the terminal with the best receiving condition and the base station position information, and the device peculiar delay time calculating section of the information supply device calculates the device peculiar delay time by subtracting the propagation delay time from the total delay time included in the basic information received from the terminal with the best receiving condition.

4. A method that allows a positioning terminal to receive information from an information supply device communicable with a communication base station and a terminal and perform positioning using a signal from the communication base station, the terminal including a local clock, a time error of the local clock being calibrated at any time based on a satellite time of positioning satellites, and the information supply device including a base station position information storage section that stores base station position information indicating a position of the communication base station, the method comprising:

causing the communication base station to transmit a base station timing signal to the terminal, the base station timing signal being a signal at a predetermined time interval;

causing the terminal to locate a current position based on satellite signals that are signals from the positioning satellites;

causing the terminal to receive the base station timing signal transmitted from the communication base station;

causing the terminal to calculate a timing difference between the base station timing signal and a standard timing signal indicated by the local clock as a total delay time that includes a drift of the local clock depending on a temperature, a delay time based on signal processing in the communication base station and the terminal, and a propagation delay time between the communication base station and the terminal;

causing the terminal to transmit basic information including the position located by the terminal and the total delay time to the information supply device via communication device;

causing the information supply device to receive the basic information including the position located by the terminal and the total delay time from the terminal via the communication base station;

causing the information supply device to calculate a distance between the terminal and the communication base station based on the position located by the terminal and the base pg,68 station position information to calculate a propagation delay time requited for a signal to propagate the distance;

causing the information supply device to calculate a delay time other than the propagation delay time as a device peculiar delay time by subtracting the propagation delay time from the total delay time;

causing the information supply device to transmit the device peculiar delay time to the positioning terminal; and causing the positioning terminal to calculate a net propagation delay time and perform positioning using the net propagation delay time.

* * * * *